United States Patent
Bae et al.

(10) Patent No.: US 8,514,479 B2
(45) Date of Patent: Aug. 20, 2013

(54) ELECTRO-WETTING DISPLAY

(75) Inventors: Joo-Han Bae, Seongnam-si (KR); Tae Hyung Hwang, Seoul (KR); Kyungtae Chae, Hwaseong-si (KR); Sang-Myoung Lee, Hwaseong-si (KR); Seok-Joon Hong, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 98 days.

(21) Appl. No.: 13/293,569

(22) Filed: Nov. 10, 2011

(65) Prior Publication Data
US 2012/0262774 A1    Oct. 18, 2012

(30) Foreign Application Priority Data

Apr. 14, 2011    (KR) .................. 10-2011-0034858

(51) Int. Cl.
*G02B 26/00* (2006.01)
*G09G 3/34* (2006.01)

(52) U.S. Cl.
USPC ............. 359/290; 345/84; 345/85; 359/292

(58) Field of Classification Search
CPC ................... G02B 26/004; G09G 3/3433
USPC .............. 345/55, 84, 85, 690; 359/290, 291, 359/292, 297
See application file for complete search history.

(56) References Cited

U.S. PATENT DOCUMENTS

| | | | |
|---|---|---|---|
| 2009/0079689 A1 | 3/2009 | Miyata et al. | |
| 2009/0195850 A1 | 8/2009 | Takahashi | |
| 2011/0227080 A1* | 9/2011 | Roh et al. ................. | 257/59 |
| 2013/0076722 A1* | 3/2013 | Choi et al. ............... | 345/212 |

FOREIGN PATENT DOCUMENTS

| | | |
|---|---|---|
| JP | 2009-211047 A | 9/2009 |
| JP | 2009-258380 A | 11/2009 |
| KR | 10-2009-0086028 A | 8/2009 |

* cited by examiner

*Primary Examiner* — David N Spector
(74) *Attorney, Agent, or Firm* — Cantor Colburn LLP

(57) ABSTRACT

An electro-wetting display includes a first substrate, a second substrate which faces the first substrate, and a fluid layer between the first and second substrates. The first substrate includes a plurality of gate lines, a plurality of data lines, and a plurality of pixels connected to the gate lines and the data lines. A fluid layer includes a first fluid layer having a color and a second fluid layer which is transparent. Each pixel includes a switching device, a pixel electrode in connection with the switching device, and a spacing electrode. The switching device is connected to an i-th gate line of the gate lines and a j-th data line of the data lines. The spacing electrode is adjacent to a side of the pixel electrode and in connection with a (i−1)th gate line of the gate lines.

20 Claims, 26 Drawing Sheets

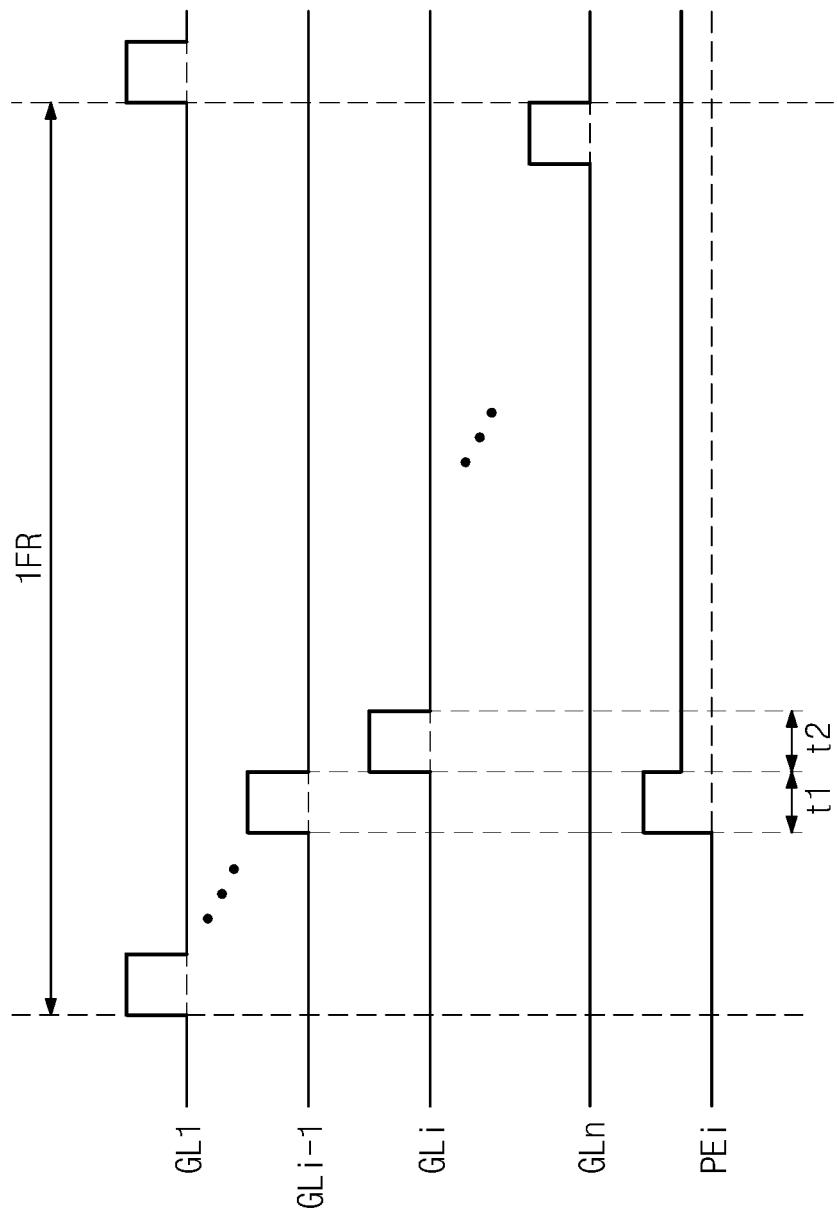

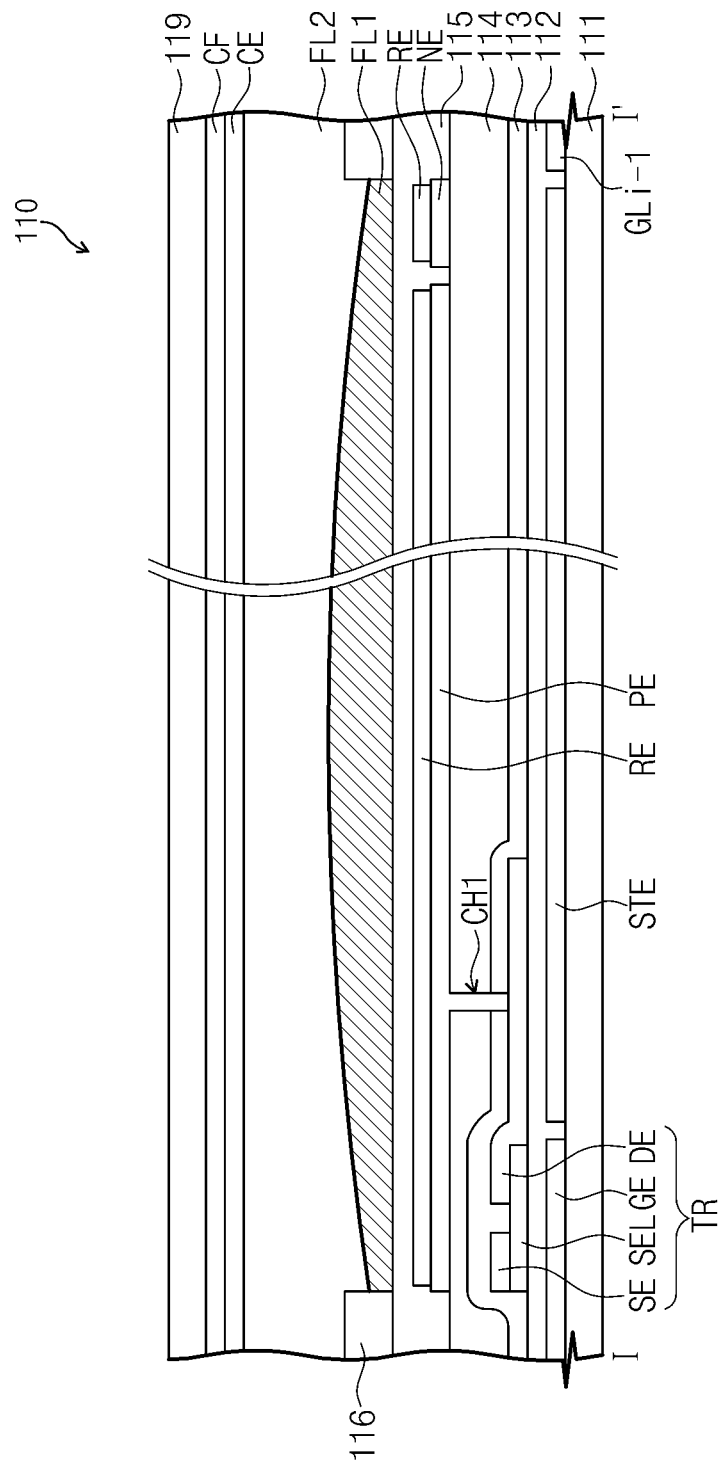

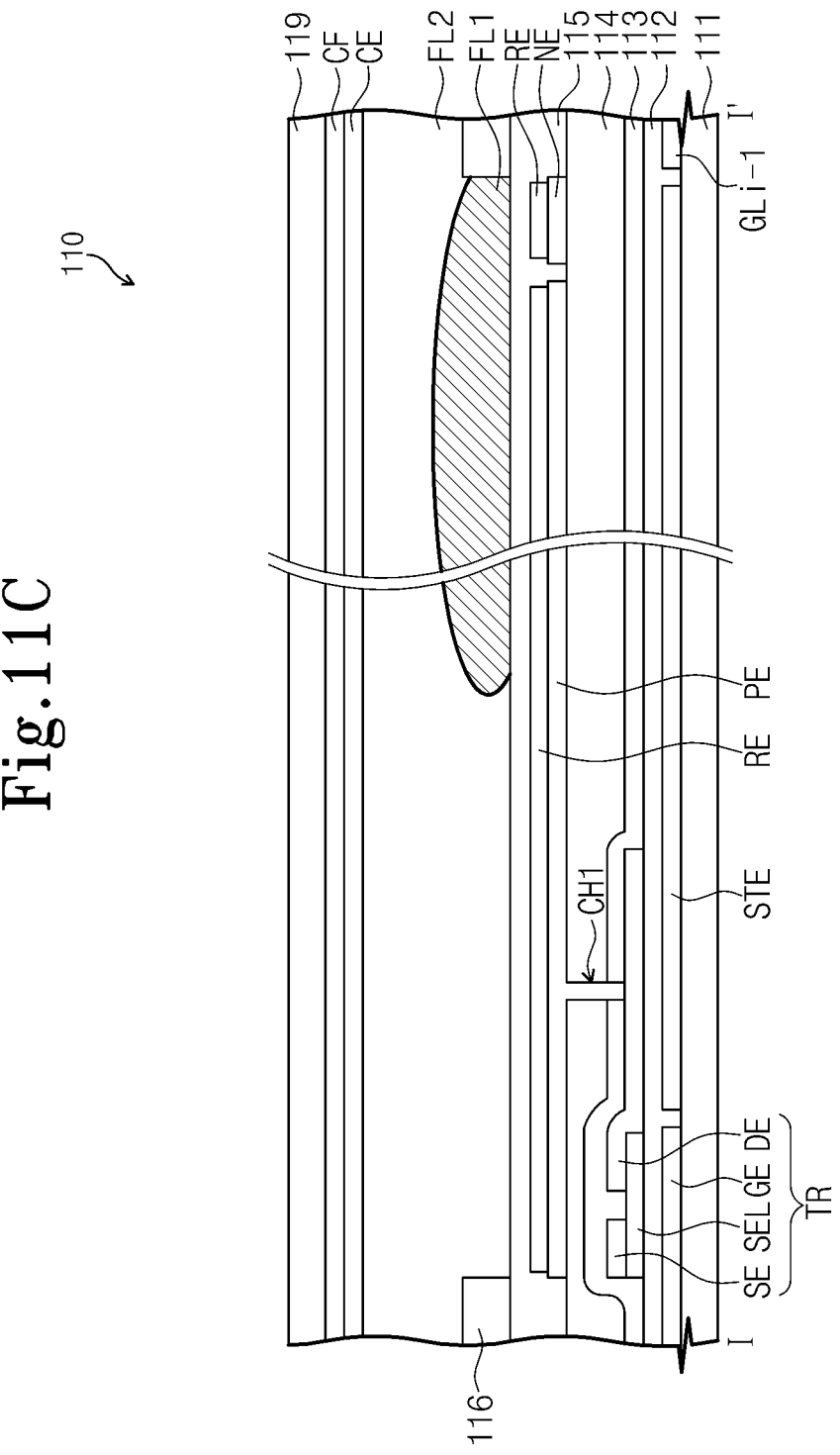

ELECTRO-WETTING DISPLAY

This application claims priority to Korean Patent Application No. 10-2011-0034858 filed on Apr. 14, 2011, and all the benefits accruing therefrom under 35 U.S.C. §119, the contents of which are herein incorporated by reference in its entirety.

BACKGROUND OF THE INVENTION

1. Field of the Invention

The invention relates to an electro-wetting display having improved display characteristics.

2. Description of the Related Art

A display apparatus using an electro-wetting phenomenon, in which a surface tension of fluid is varied by voltage applied thereto and the variation of the surface tension causes movement or deformation of fluid, is called an electro-wetting display.

The electro-wetting display has superior light transmittance and reflectance, low power consumption, and fast response speed since the electro-wetting display does not need a polarizing plate. Accordingly, the electro-wetting display has been researched and developed as a next-generation display.

However, a hysteresis phenomenon occurs at specific voltage according to the surface tension of the fluid used in the electro-wetting display.

BRIEF SUMMARY OF THE INVENTION

Exemplary embodiments of the invention provide an electro-wetting display having improved display characteristics.

According to an exemplary embodiment, an electro-wetting display includes a first substrate, a second substrate which faces the first substrate, and a fluid layer between the first substrate and the second substrate.

The first substrate includes a plurality of gate line, a plurality of data lines, and a plurality of pixels in connection with the gate lines and the data lines. The fluid layer includes a first fluid layer having a color and a second fluid layer which is transparent.

Each of the pixels includes a switching device, a pixel electrode in connection with the switching device, and further includes a spacing electrode. The switching device is in connection with an i-th gate line of the gate lines and a j-th data line of the data lines. The "i" is a constant number equal to or larger than 2 and the "j" is a constant number equal to or larger than 1. The spacing electrode is adjacent to a side of the pixel electrode and in connection with a (i−1)th gate line of the gate lines.

According to another exemplary embodiment, an electro-wetting display includes a first substrate, a second substrate which faces the first substrate, and a fluid layer between the first and second substrates.

The first substrate includes a plurality of gate lines, a plurality of data lines, and a plurality of pixels in connection with the gate lines and the data lines. The fluid layer includes a first fluid layer having a color and a second fluid layer which is transparent.

Each of the pixels includes a switching device and a pixel electrode. The switching device is in connection with an i-th gate line of the gate lines and a j-th data line of the data lines. The "i" is a constant number equal to or larger than 2 and the "j" is a constant number equal to or larger than 1. The pixel electrode is in connection with the switching device and a (i−1)th gate line of the gate lines.

According to the above, when the pixel connected to a gate line is driven, a gate-on voltage applied to a previous gate line is used. Thus, abnormal gray scale appearing on the pixel due to a hysteresis phenomenon may be reduced or effectively prevented, and a lowering of response speed may be reduced or effectively prevented.

BRIEF DESCRIPTION OF THE DRAWINGS

The above and other advantages of the invention will become readily apparent by reference to the following detailed description when considered in conjunction with the accompanying drawings wherein:

FIG. 10 is a timing diagram illustrating an exemplary embodiment of a method of driving the display panel of FIGS. 8 and 9;

FIGS. 11A to 11C are cross-sectional views showing the display panel to illustrate movement of first and second fluids according to the timing diagram of FIG. 10;

DETAILED DESCRIPTION OF THE INVENTION

Figure 1:
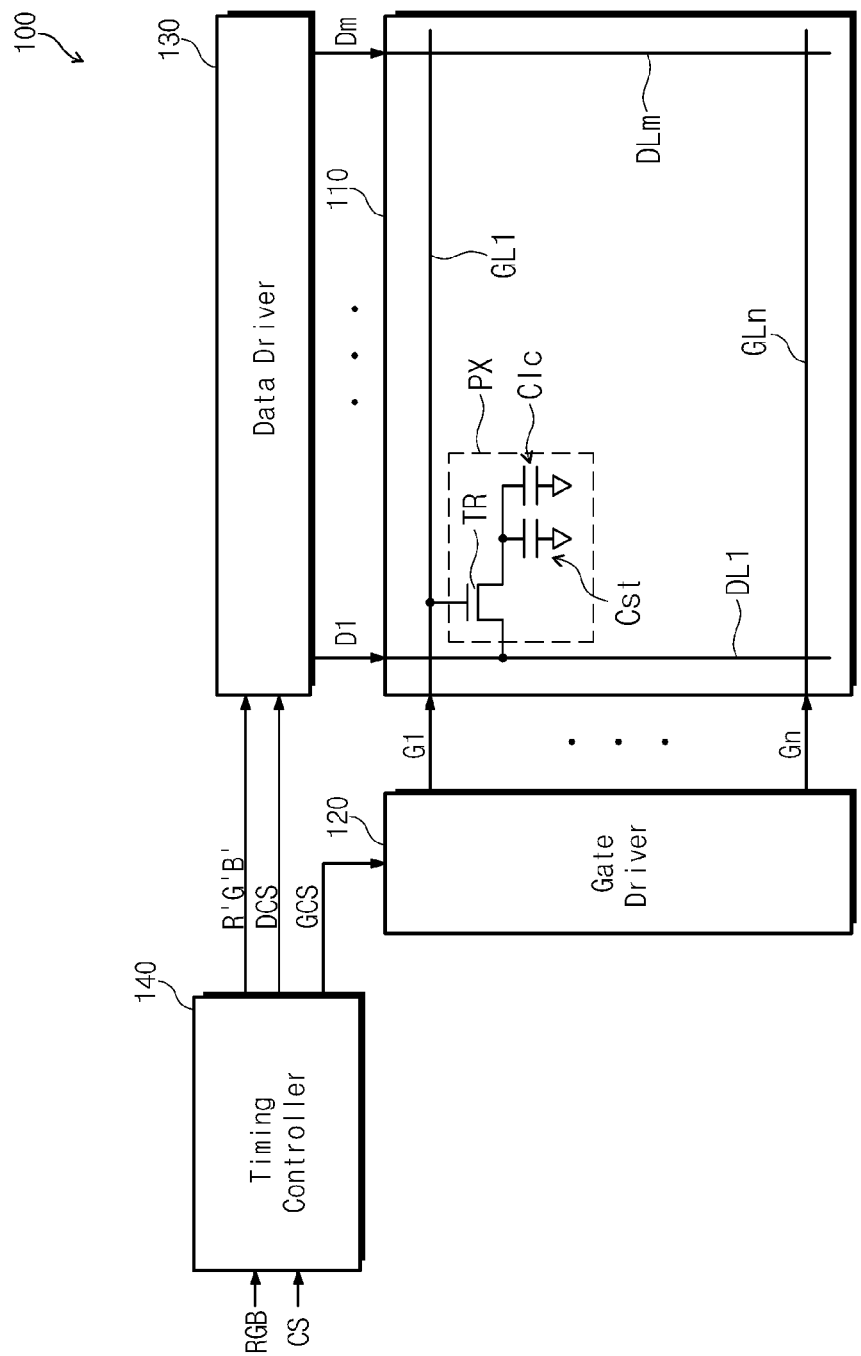
FIG. 1 is a block diagram showing an exemplary embodiment of an electro-wetting display according to the invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "above," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

FIG. 1 is a block diagram showing an exemplary embodiment of an electro-wetting display according to the invention.

Referring to FIG. 1, an electro-wetting display 100 includes a display panel 110, a gate driver 120, a data driver 130, and a timing controller 140.

The timing controller 140 receives image signals RGB and a control signal CS from an external device (not shown). The timing controller 140 converts a data format of the image signals RGB into a data format appropriate to an interface between the timing controller 140 and the data driver 130 and provides the converted image signals R'G'B' to the data driver 130. In addition, the timing controller 140 applies data control signals DCS, such as an output start signal, a horizontal start signal, and a polarity inversion signal, etc., to the data driver 130.

The timing controller 140 applies gate control signals GCS, such as a vertical start signal, a vertical clock signal, and a vertical clock bar signal, etc., to the gate driver 120.

The gate driver 120 sequentially outputs gate signals G1 to Gn in response to the gate control signals GCS provided from the timing controller 140.

The data driver 130 converts the image signals R'G'B' into the data voltages D1 to Dm in response to the data control signals DCS provided from the timing controller 140. The data voltages D1 to Dm output from the data driver 130 are applied to the display panel 110.

The display panel 110 includes a plurality of gate lines GL1 to GLn, a plurality of data lines DL1 to DLm crossing the gate lines GL1 to GLn, and a plurality of pixels PX.

In the illustrated exemplary embodiment, the pixels PX have the same structure and function, and thus one pixel has been shown in FIG. 1 as a representative example.

Each pixel PX includes a thin film transistor TR, a liquid crystal capacitor Clc, and a storage capacitor Cst. The liquid crystal capacitor Clc may include a pixel electrode PE and a common electrode as terminals thereof, and the storage capacitor Cst may include a pixel electrode and a storage electrode as terminals thereof.

The thin film transistor TR includes a gate electrode GE connected to a corresponding gate line of the gate lines GL1 to GLn, a source electrode SE connected to a corresponding data line of the data lines DL1 to DLm, and a drain electrode DE connected to the pixel electrode PE and the storage capacitor Cst.

The gate lines GL1 to GLn are connected to the gate driver 120 to receive the gate signals G1 to Gn. The data lines DL1 to DLm are connected to the data driver 130 to receive the data voltages D1 to Dm provided from the data driver 130.

The thin film transistor TR in each pixel PX is turned on in response to the gate signal applied through the corresponding gate line, and the data voltage applied to the corresponding data line is applied to the pixel electrode through the turned-on thin film transistor. The common electrode facing the pixel electrode is applied with the common voltage.

Although not shown in FIG. 1, the electrowetting display 100 may further include a backlight unit that provides light to the display panel 110. The backlight unit includes a plurality of light sources, and the light sources may be light emitting diodes ("LEDs") or cold cathode fluorescent lamps ("CCFLs"), but the invention is not limited thereto.

Figure 2:
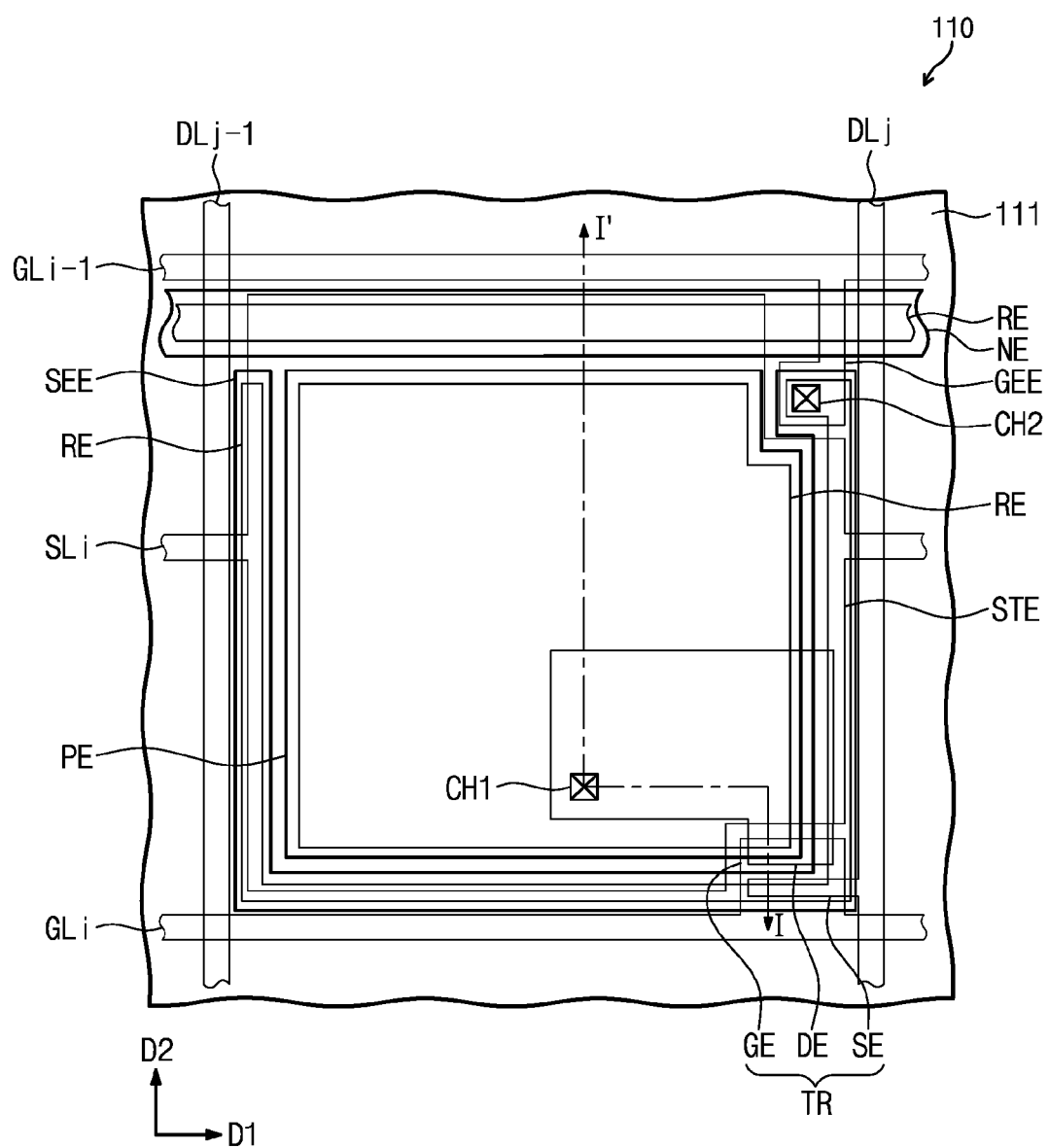
FIG. 2 is an enlarged plan view showing an exemplary embodiment of the display panel of FIG. 1.
Figure 3:
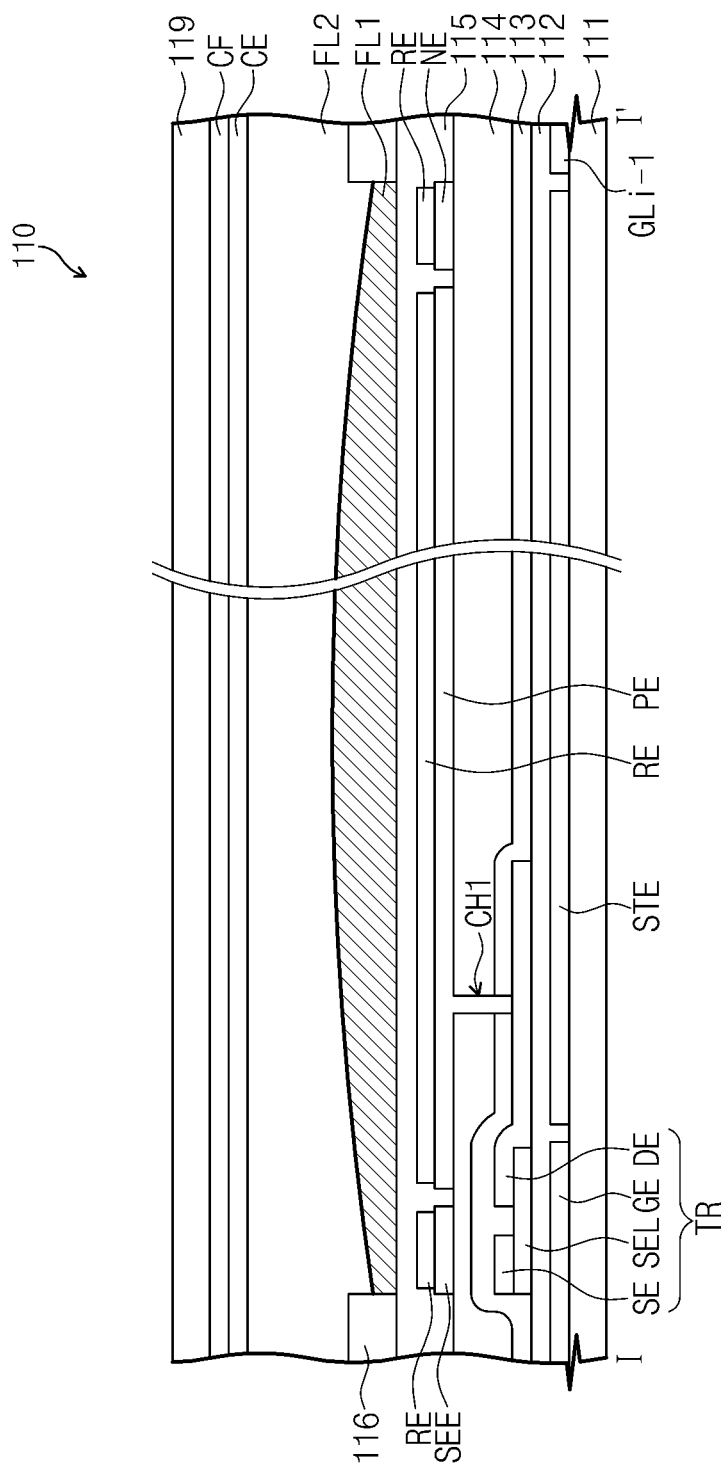
FIG. 3 is a cross-sectional view taken along line I-I' of FIG. 2.

FIG. 2 is an enlarged plan view showing the display panel of FIG. 1 and FIG. 3 is a cross-sectional view taken along line I-I' of FIG. 2. For the convenience of explanation, one pixel has been shown in FIGS. 1 and 2 as an example.

Referring to FIG. 2, the display panel 110 includes first and second gate lines GLi-1 and GLi that are longitudinally extended in a first direction D1, first and second data lines DLj-1 and DLj that are longitudinally extended in a second direction D2 and insulated from the first and second gate lines GLi-1 and GLi, the thin film transistor TR connected to the second gate line GLi and the second data line DLj, and a pixel electrode PE connected to the thin film transistor TR.

The thin film transistor TR includes the gate electrode GE connected to the second gate line GLi, the source electrode SE connected to the second data line DLj, and the drain electrode DE connected to the pixel electrode PE through a first contact hole CH1.

The display panel 110 includes a spacing electrode SEE that is spaced apart from the pixel electrode PE and parallels the first and second data lines DLj-1 and DLj and the second gate line GLi. The spacing electrode SEE is connected to a gate protrusion electrode GEE protruded and extended from the first gate line GLi-1 through a second contact hole CH2. Thus, the spacing electrode SEE is applied with the gate signal input to the first gate line GLi-1. As shown in FIG. 2, the spacing electrode SEE has a U-shape, but the shape should not be limited thereto or thereby.

The display panel 110 may include a notch electrode NE that is spaced apart from the pixel electrode PE and the spacing electrode SEE, and longitudinally positioned parallel the first gate line GLi-1. The notch electrode NE may be positioned at a location, in which the spacing electrode SEE is not placed, adjacent to a side of the pixel electrode PE, such that the notch electrode NE and the spacing electrode SEE do not overlap. The notch electrode NE may be applied with the common voltage to control the movement of a first fluid FL1 shown in FIG. 2. In detail, when the data voltage is applied to the pixel electrode PE, the first fluid FL1 moves toward the position at which the notch electrode NE is positioned. However, the display panel 110 may not include the notch electrode NE according to alternative embodiments. Where the display panel 110 does not include the notch electrode NE, the direction of the movement of the first fluid FL1 may be controlled by the shape of the pixel electrode PE.

A reflective electrode RE may be further disposed on the pixel electrode PE, the notch electrode NE, and the spacing electrode SEE. The reflective electrode RE reflects light incident into the electro-wetting display 100 when the electro-wetting display 100 is used as a reflective-type display apparatus. Thus, the reflective electrode RE may include a metal material having a high light reflectance, for example, aluminum.

The display panel 110 may further include a storage electrode STE longitudinally extended in the first direction D1 and disposed between the first and second gate lines GLi-1 and GLi. The storage electrode STE faces the pixel electrode PE to form a storage capacitor. The storage electrode STE is connected to a storage line SLi to receive the common voltage. The storage line SLi is longitudinally extended in the first direction D1.

Referring to FIG. 3, the display panel 110 includes a first base substrate 111, and a second base substrate 119 facing the first base substrate 111. The first and second base substrates 111 and 119 may include a flexible material, such as polyethylene terephthalate ("PET"), fiber reinforced plastic ("FRP"), or polyethylene naphthalate ("PEN").

The first and second gate lines GLi-1 and GLi, the gate electrode GE, and the storage electrode STE are disposed on the first base substrate 111. A gate insulating layer 112 is disposed on the first and second gate lines GLi-1 and GLi, the gate electrode GE, and the storage electrode STE.

A semiconductor layer SEL is disposed on the gate insulating layer 112. Although not shown in FIG. 3, the semiconductor layer SEL may include an active layer and an ohmic contact layer.

The source electrode SE is disposed directly on the semiconductor layer SEL, and the drain electrode DE is disposed directly on both the semiconductor layer SEL and the gate insulating layer 112. The source electrode SE and the drain electrode DE are spaced apart from each other on the semiconductor layer SEL. The source electrode SE and the drain electrode DE are covered by a protective layer 113, and an organic insulating layer 114 may be further disposed on the protective layer 113.

The pixel electrode PE, the spacing electrode SEE, and the notch electrode NE are disposed on the organic insulating layer 114 and are spaced apart from each other. The pixel electrode PE is connected to the drain electrode DE through the first contact hole CH1 which extends through a thickness of the organic insulating layer 114 and the protective layer 113. The pixel electrode PE, the spacing electrode SEE, and the notch electrode NE may include indium tin oxide ("ITO") or indium zinc oxide ("IZO"). The reflective electrode RE may be further disposed on the pixel electrode PE, the spacing electrode SEE, and the notch electrode NE to reflect the incident light.

A hydrophobic insulating layer 115 is disposed on the reflective electrode RE. The hydrophobic insulating layer 115 includes a material having a hydrophobic property or has a surface modified into a hydrophobic property. The hydrophobic insulating layer 115 has a hydrophobic property when external electricity is not applied and has a hydrophilic property when the external electricity is applied. In the illustrated exemplary embodiment, the hydrophobic insulating layer 115 may be Teflon®.

A barrier wall 116 is disposed on the hydrophobic insulating layer 115 to space the pixels PX apart from each other.

Referring to FIGS. 2 and 3, the barrier wall 116 may be disposed parallel to the first and second gate lines GLi-1 and GLi and the first and second data lines DLj-1 and DLj. The barrier wall 116 may be hydrophilic.

A color filter CF may be disposed on the second base substrate 119. The color filter CF may include color pixels each of which represents one color of red, green, and blue colors.

A common electrode CE is disposed on the color filter CF. The common electrode CE faces the pixel electrode PE and is applied with the common voltage.

The first and second fluids FL1 and FL2 are disposed between the first and second base substrates 111 and 119. The first fluid FL1 may be oil having the hydrophobic property. In addition, the first fluid FL1 may include a black color dye or a material that absorbs light since the first fluid FL1 absorbs the incident light. The second fluid FL2 may be a material having electrical conductivity or polarity, such as water. The first and second fluids FL1 and FL2 are immiscible with each other since the first and second fluids FL1 and FL2 have different specific gravities from each other. Thus, the first and second fluids FL1 and FL2 are separated from each other with reference to a boundary therebetween.

In one exemplary embodiment, as an example, in the case that the first fluid FL1 includes a material representing red, green, and blue colors, such as a dye, the electro-wetting display 100 may not include the color filter CF.

The barrier wall 116 may reduce or effectively prevent the first fluid FL1 from moving to an adjacent pixel.

FIGS. 2 and 3 show the structure of the electro-wetting display 100 when the electro-wetting display 100 is used as the reflective-type display apparatus. Accordingly, in the case that the electro-wetting display 100 is used a transmissive-type display apparatus, the electro-wetting display 100 does not need to include the reflective electrode RE, and the area of the storage electrode STE of the electro-wetting display 100 may be varied to transmit the incident light.

Figure 4:
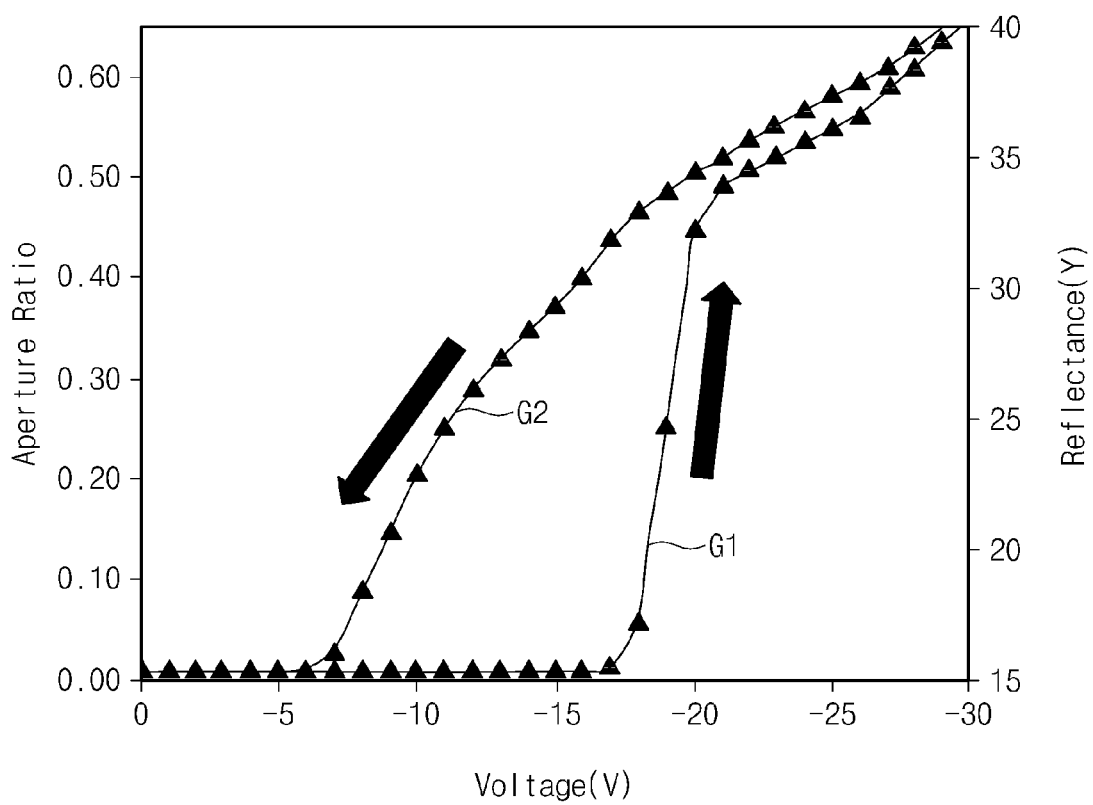
FIG. 4 is a graph showing an aperture ratio and a reflectance of a pixel according to voltage applied to the pixel.

FIG. 4 is a graph showing an aperture ratio and a reflectance (Y) of a pixel according to voltage (in volts, V) applied to the pixel.

In detail, an x-axis represents the voltage applied to the pixel electrode PE, and a y-axis represents the aperture ratio and the reflectance of the reflective area according to the movement of the first fluid FL1. In addition, a first graph G1 represents the aperture ratio of the reflective area when the voltage is gradually lowered from a reference voltage, i.e., zero volts, and a second graph G2 represents the aperture ratio of the reflective area when the voltage is gradually increased to the reference voltage.

As shown in the first graph G1, the aperture ratio increases at a voltage lower than a voltage of about −15 volts when the voltage is gradually lowered from the reference voltage. On the contrary, according to the second graph G2, the aperture ratio becomes about zero at a voltage lower than a voltage of about −5 volts when the voltage is gradually increased to the reference voltage. In other words, when the voltage is changed from zero volts to −30 volts, the aperture ratio becomes zero between zero volts and −15 volts. However, when the voltage is changed from −30 volts to zero volts, the aperture ratio becomes zero between zero volts and −5 volts.

This means that the voltage of about 15 volts is needed to separate the first fluid FL1 from the barrier wall 116 when the first fluid FL1 overlaps a whole of the pixel electrode PE by the zero volts applied to the pixel electrode PE. That is, a conventional electro-wetting display is difficult to display a specific gray scale according to the voltage due to the hysteresis phenomenon.

Figure 5:
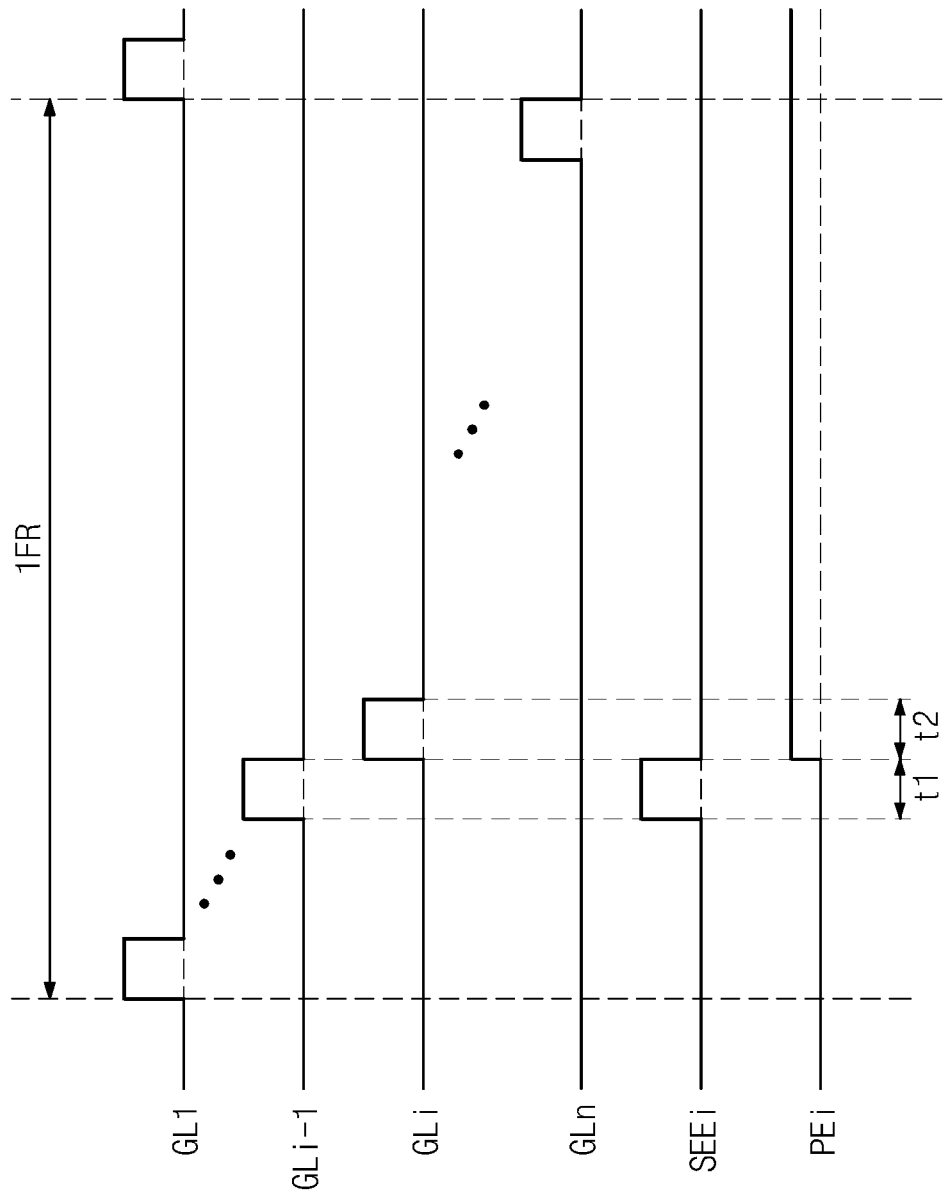
FIG. 5 is a timing diagram illustrating an exemplary embodiment of a method of driving the display apparatus of FIGS. 1 and 2.

FIG. 5 is a timing diagram illustrating an exemplary embodiment of a method of driving the electro-wetting display of FIGS. 1 and 2, and FIGS. 6A to 6C are cross-sectional views showing the display panel to illustrate movement of first and second fluids according to the timing diagram of FIG. 5.

Referring to FIG. 5, the electro-wetting display 100 sequentially drives the first to n-th gate lines GL1 to GLn within one frame time period 1FR to display an image. The one frame time period 1FR may be ⅟60 second or ⅟120 second.

In FIG. 5, among the first to n-th gate lines GL1 to GLn, a gate line located at the (i−1)th row is referred to as a (i−1)th gate line GLi-1 and a gate line located at the i-th row is referred to as an i-th gate line GLi. In the illustrated exemplary embodiment, "i" is a constant number equal to or larger than 2. In addition, a spacing electrode disposed in the pixel connected to the i-th gate line GLi is referred to as an i-th spacing electrode SEEi, and a pixel electrode disposed in the pixel connected to the i-th gate line GLi is referred to as an i-th pixel electrode PEi. The timing diagram shown in FIG. 5 shows the levels of the voltages applied to the first to n-th gate lines GL1 to GLn, the i-th spacing electrode SEEi, and the i-th pixel electrode PEi.

Figure 6A:
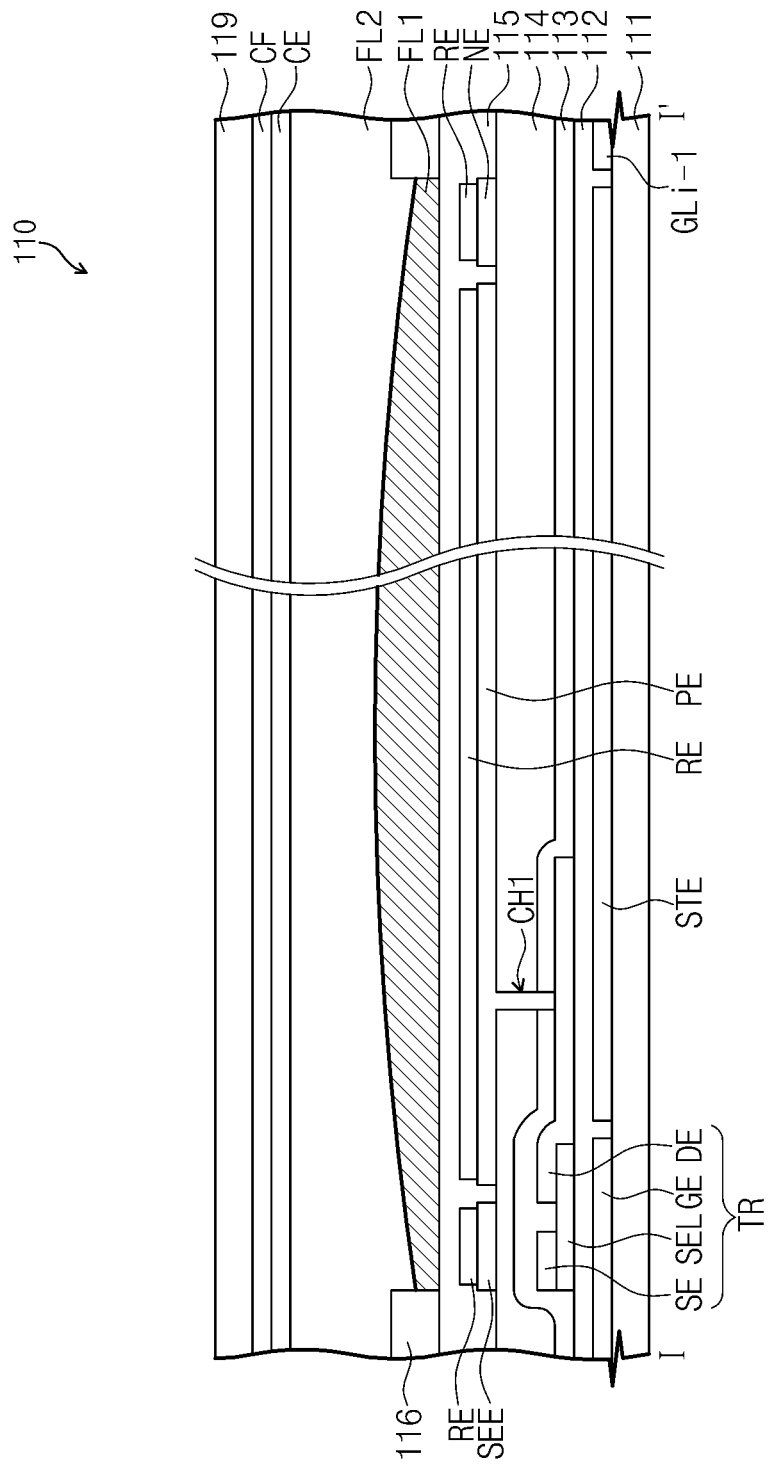
FIGS. 6A to 6C are cross-sectional views showing the display panel to illustrate movement of first and second fluids according to the timing diagram of FIG. 5.

Referring to FIGS. 5 and 6A, the voltage is not applied to the i-th spacing electrode SEEi and the i-th pixel electrode PEi when a gate-on signal is not applied to the (i−1)th gate line GLi-1. Accordingly, the first fluid FL1 covers the whole of the hydrophobic insulating layer 115 as shown in FIG. 6A.

Figure 6B:
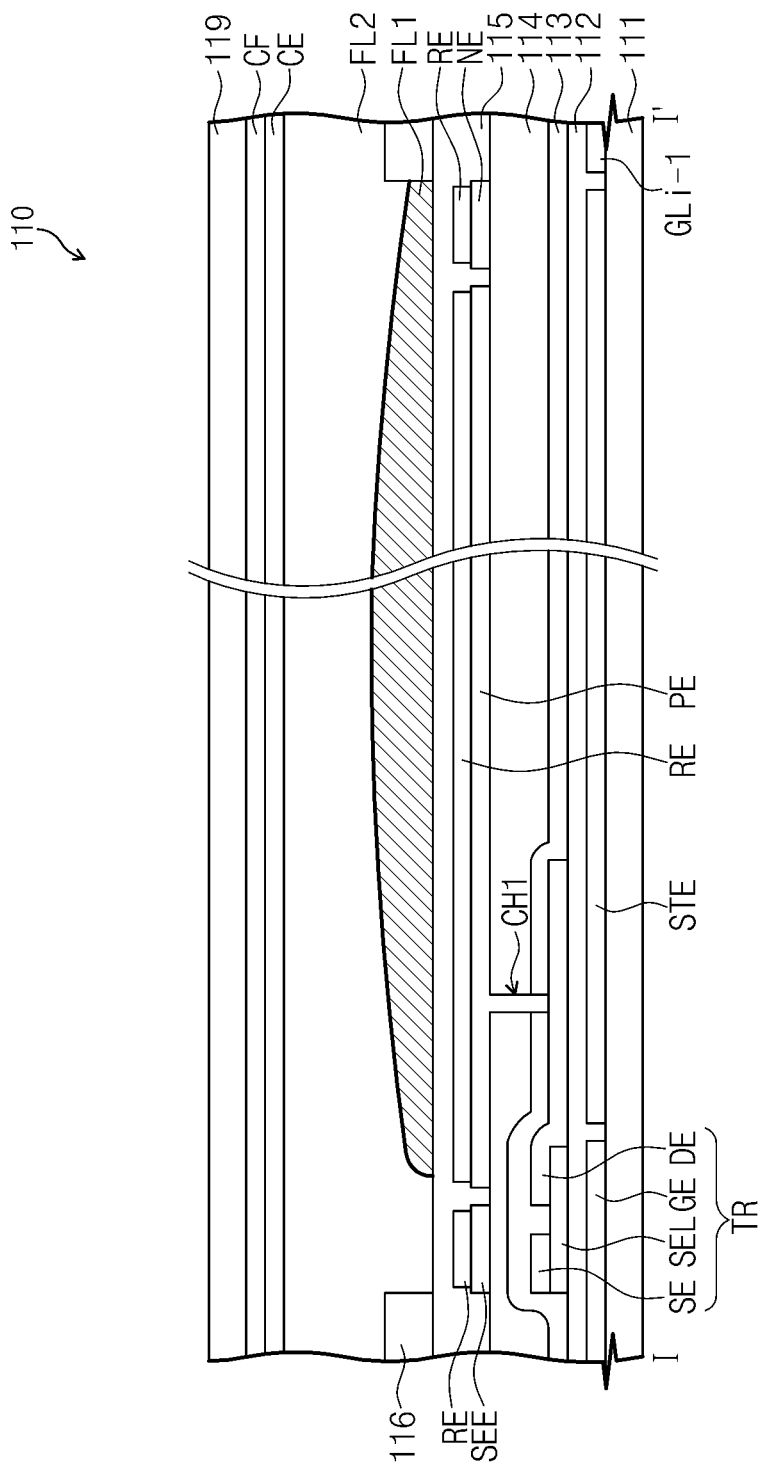

Referring to FIGS. 5 and 6B, when the gate-on signal is applied to the (i−1)th gate line GLi-1 during a first time period t1, the voltage having the same level as the gate-on signal is applied to the i-th spacing electrode SEEi during the first time period t1. Accordingly, the first fluid FL1 disposed on the i-th spacing electrode SEEi is spaced apart from the barrier wall 116. In detail, when the gate-on voltage is applied to the i-th spacing electrode SEEi, the second fluid FL2 disposed above the i-th spacing electrode SEEi moves to the hydrophobic insulating layer 115 by an electric field formed between the i-th spacing electrode SEEi and the common electrode CE, and makes contact with the hydrophobic insulating layer 115.

Thus, the first fluid FL1 disposed on the i-th spacing electrode SEEi becomes spaced-apart from the barrier wall 116 by the movement of the second fluid FL2.

Figure 6C:
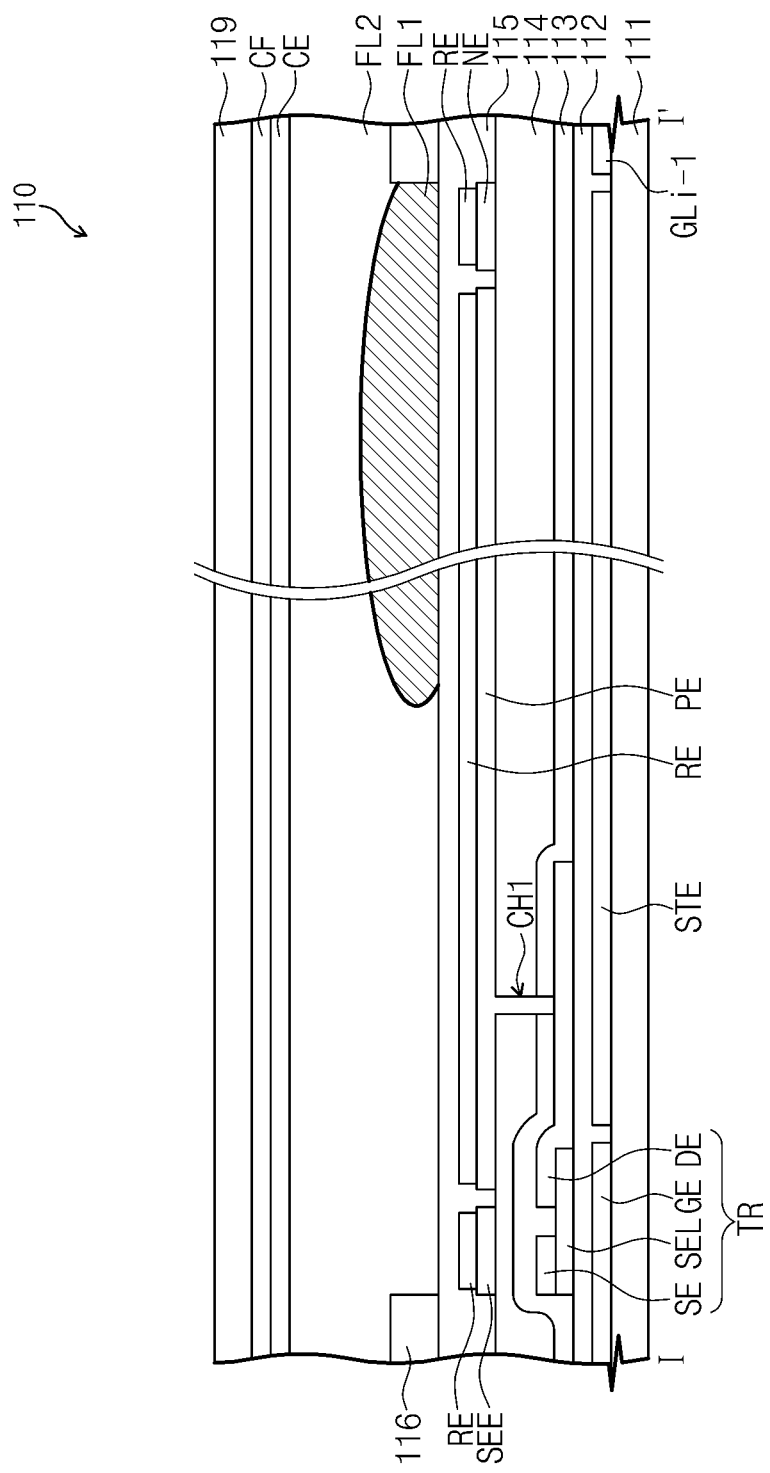

As shown in FIGS. 5 and 6C, the data voltage is applied to the i-th pixel electrode PEi in response to the gate-on signal applied to the i-th gate line GLi during a second time period t2, and the data voltage is maintained during one frame time period. Thus, the first fluid FL1 is further spaced-apart from the barrier wall 116.

In other words, the i-th spacing electrode SEEi spaces the first fluid FL1 apart from the barrier wall 116 before the data voltage is applied to the i-th pixel electrode PEi. Thus, abnormal gray scale appearing on the pixel due to the hysteresis phenomenon may be reduced or effectively prevented, even though the specific gray scale is displayed by applying the data voltage to the i-th pixel electrode PEi.

FIGS. 7A to 7D are plan views illustrating an exemplary embodiment of a method of manufacturing the display panel of FIG. 2.

Figure 7A:
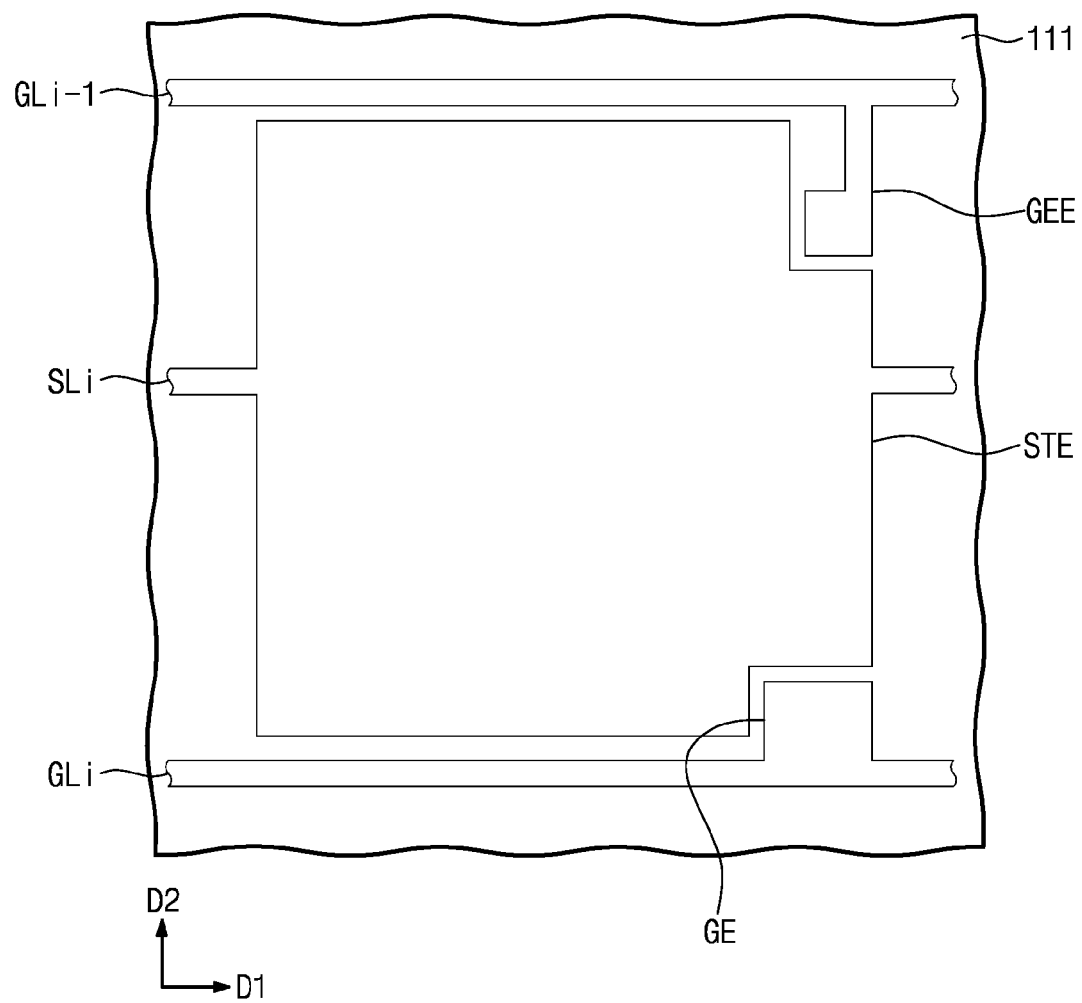
FIGS. 7A to 7D are plan views illustrating a method of manufacturing the display panel of FIG. 2.

Referring to FIG. 7A, the first gate line GLi-1, the second gate line GLi, and the storage line SLi are formed on the first base substrate 111 to be longitudinally extended in the first direction D1 and spaced apart from each other. In addition, the gate protrusion electrode GEE extended from the first gate line GLi-1 in the second direction D2, the gate electrode GE extended from the second gate line GLi in the second direction D2, and the storage electrode STE extended from the storage line SLi in the second direction D2 are formed on the first base substrate 111.

Although not shown in FIG. 7A, the gate insulating layer 112 is formed on the first base substrate 111 to cover the first gate line GLi-1, the second gate line GLi, and the storage line SLi. In addition, the semiconductor layer SEL is formed on the gate electrode GE and the gate insulating layer 112.

Figure 7B:
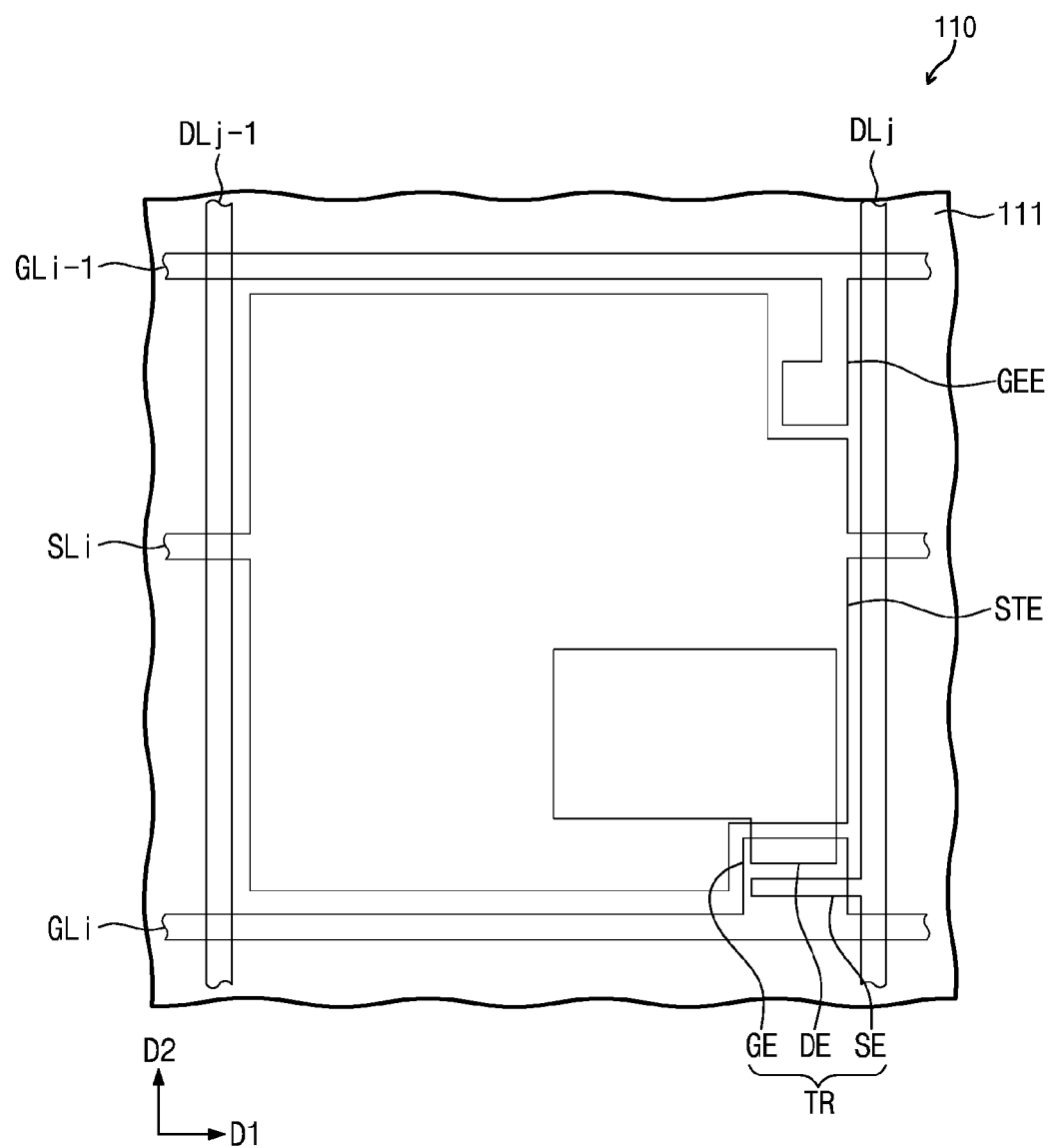

Referring to FIG. 7B, the first data line DLj-1 and the second data line DLj are formed on the gate insulating layer 112 to be spaced apart from each other and are longitudinally extended in the second direction D2. The source electrode SE is extended from the second data line DLj in the first direction D1, and the drain electrode DE is formed spaced apart from the source electrode SE.

Although not shown in FIG. 7B, the protective layer 113 is formed on the first data line DLj-1 and the second data line DLj. In addition, the organic insulating layer 114 may be further formed on the protective layer 113.

Figure 7C:
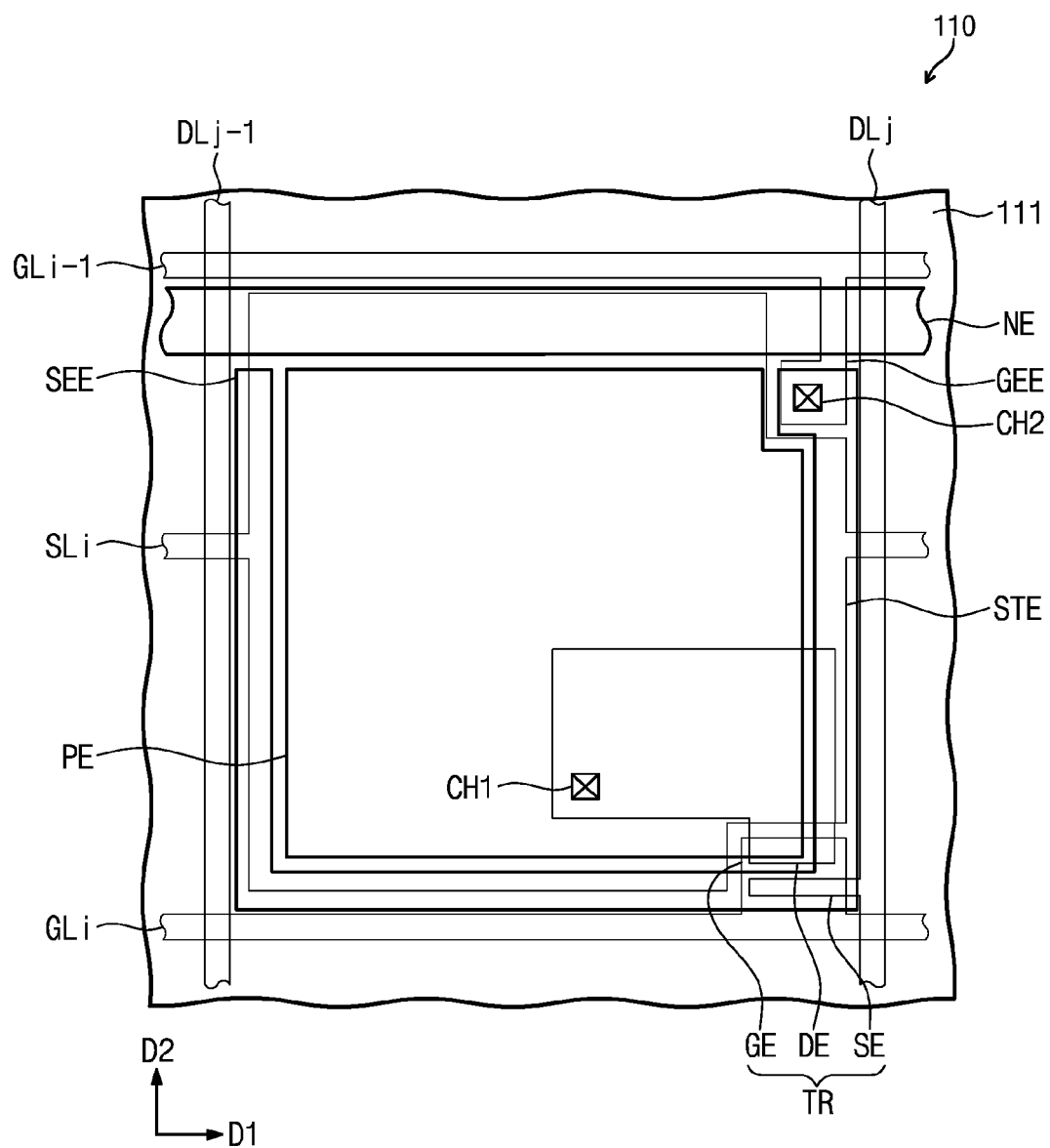

Referring to FIG. 7C, the pixel electrode PE, the notch electrode NE, and the spacing electrode SEE are formed on the protective layer 113 and the organic insulating layer 114. The notch electrode NE is longitudinally extended in the first direction D1 parallel to the first gate line GLi-1, and the spacing electrode SEE is formed to surround the pixel electrode PE in cooperation with the notch electrode NE. In FIG. 7C, the spacing electrode SEE is formed to have the plan view U-shape, but the spacing electrode SEE should not be limited to the U-shape.

The pixel electrode PE is connected to the drain electrode DE through the first contact hole CH1 formed through a thickness of the protective layer 113 and the organic insulating layer 114, and the spacing electrode SEE is connected to the gate protrusion electrode GEE through the second contact hole CH2 formed through a thickness of the protective layer 113 and the organic insulating layer 114.

Figure 7D:
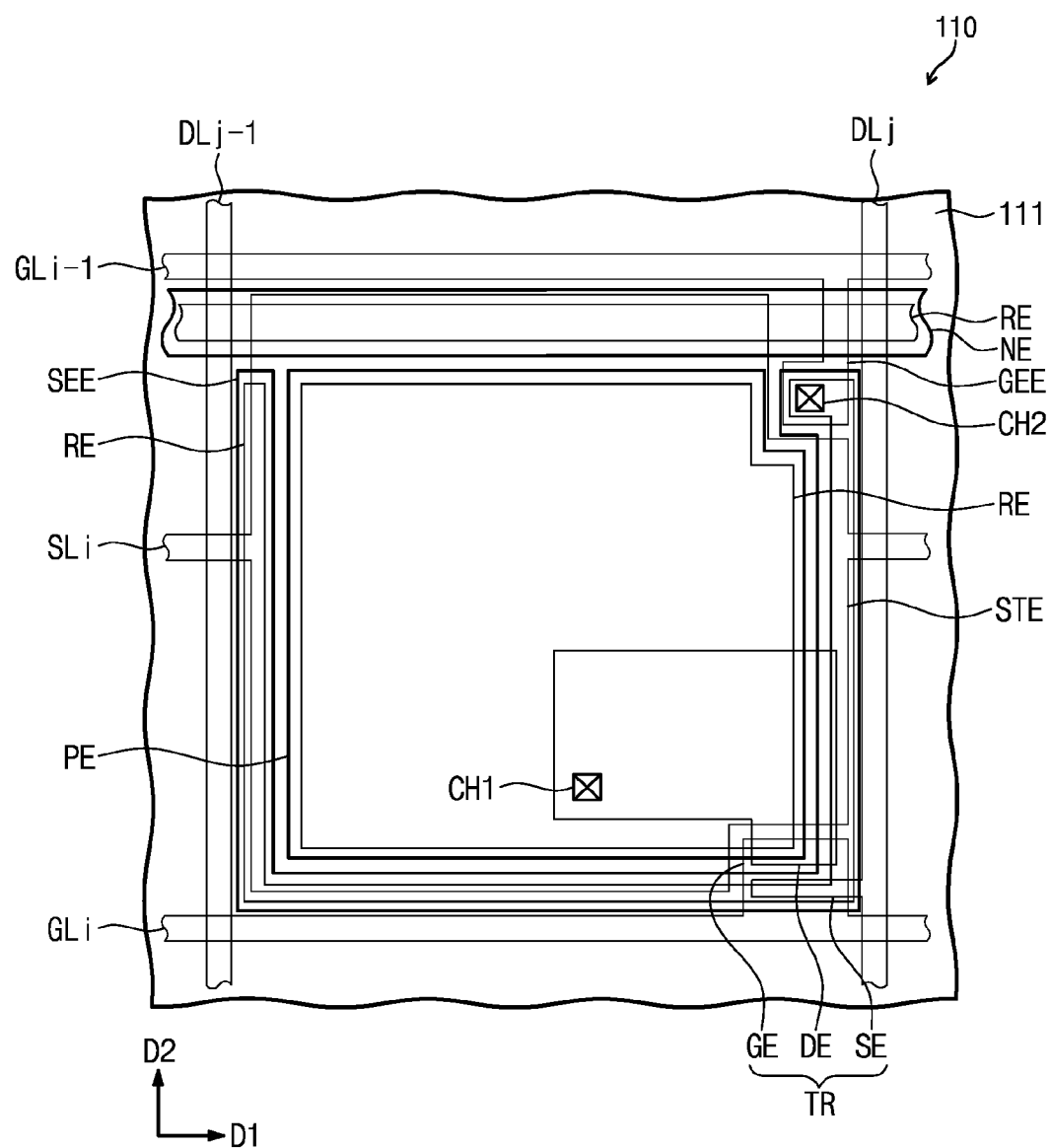

Referring to FIG. 7D, the reflective electrode RE is formed on the pixel electrode PE, the notch electrode NE, and the spacing electrode SEE. The reflective electrode RE includes a material having the high light reflectance to reflect the light incident from an exterior.

Figure 8:
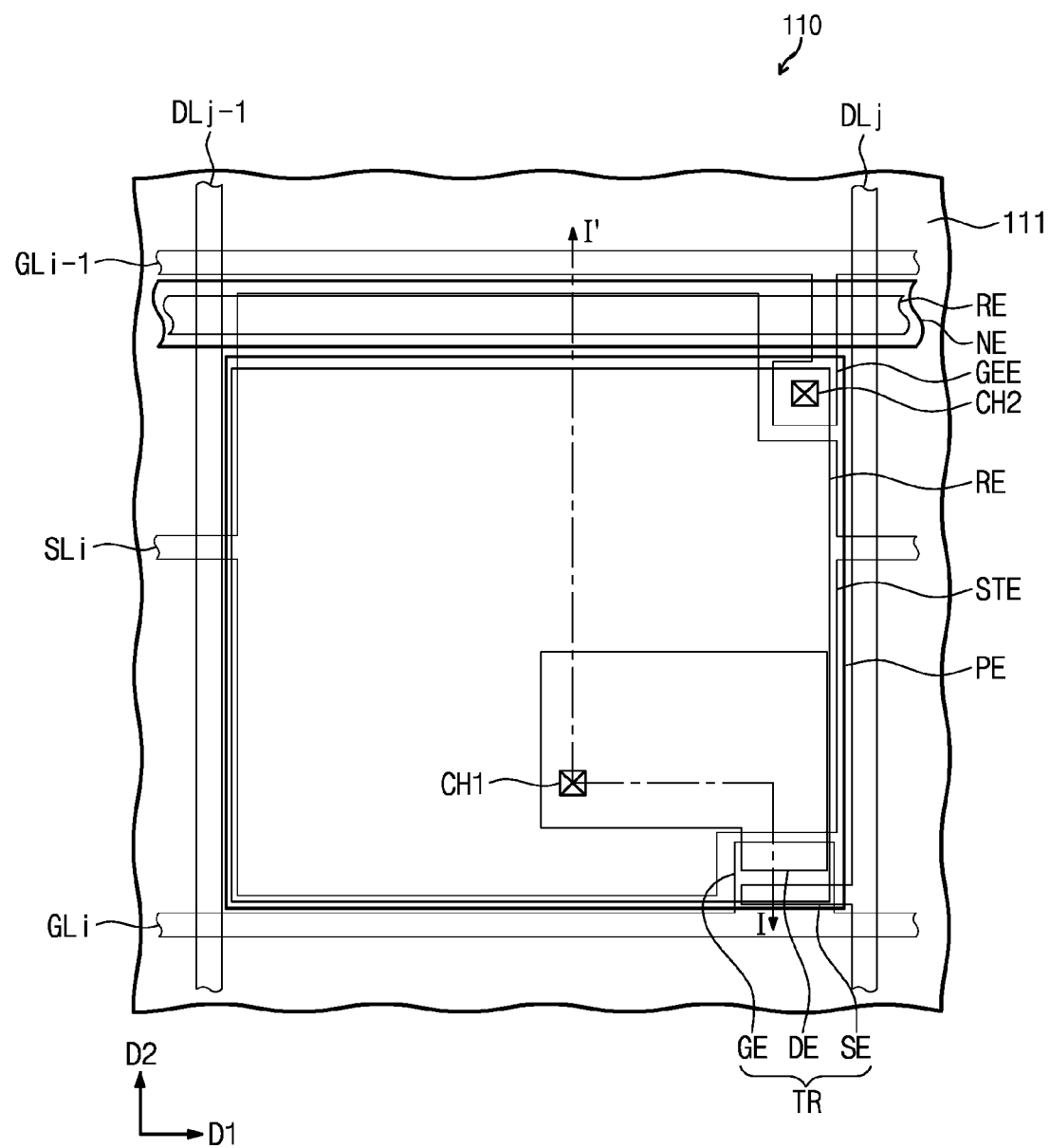
FIG. 8 is an enlarged plan view showing another exemplary embodiment of the display panel of FIG. 1 according to the invention.
Figure 9:
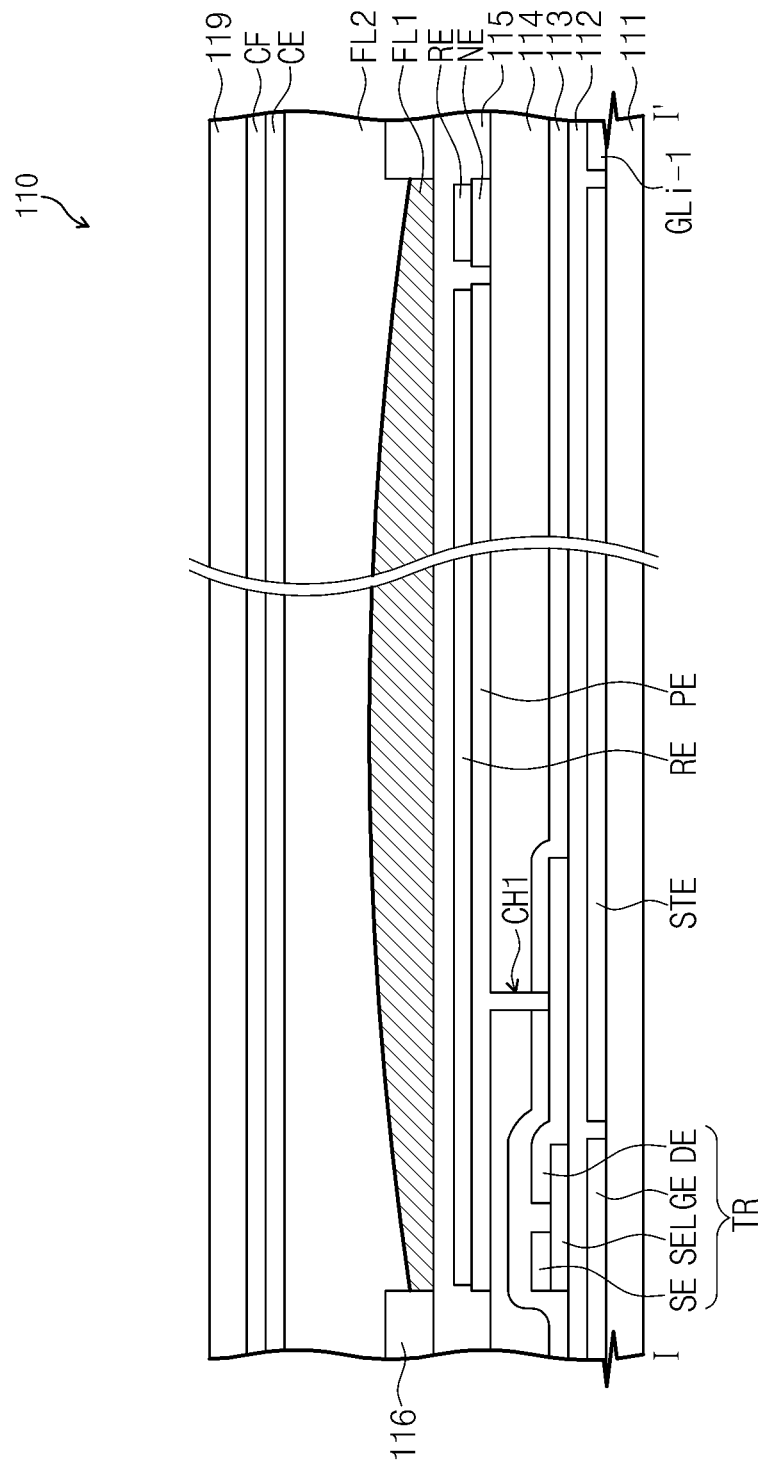
FIG. 9 is a cross-sectional view taken along line I-I' of FIG. 8.

FIG. 8 is an enlarged plan view showing another exemplary embodiment of the display panel of FIG. 1 according to the invention and FIG. 9 is a cross-sectional view taken along line I-I' of FIG. 8. In FIGS. 8 and 9, the same reference numerals denote the same elements in FIGS. 2 and 3, and thus detailed descriptions of the same elements will be omitted. In addition, since the pixels shown in FIG. 1 have the same structure and function, one pixel has been shown in FIG. 8 as a representative example.

Referring to FIG. 8, the display panel 110 includes the first and second gate lines GLi-1 and GLi longitudinally extended in the first direction D1, the first and second data lines DLj-1 and DLj longitudinally extended in the second direction D2 and insulated from the first and second gate lines GLi-1 and GLi, the thin film transistor TR connected to the second gate line GLi and the second data lines DLj, and the pixel electrode PE connected to the thin film transistor TR.

The thin film transistor includes the gate electrode GE connected to the second gate line GLi, the source electrode SE connected to the second data line DLj, and the drain electrode DE connected to the pixel electrode PE through the first contact hole CH1.

The pixel electrode PE is connected to the gate protrusion electrode GEE extended from the first gate line GLi-1 through the second contact hole CH2. Accordingly, the pixel electrode PE receives both a data voltage applied through the drain electrode DE and a gate signal applied through the first gate line GLi-1.

The display panel 110 may include the notch electrode NE spaced apart from the pixel electrode PE and disposed parallel to the first gate line GLi-1. The notch electrode NE may be applied with the common voltage to control the movement of the first fluid FL1 shown in FIG. 9. In detail, when the data voltage is applied to the pixel electrode PE, the first fluid FL1 moves toward the position at which the notch electrode NE is positioned. However, the display panel 110 may not include the notch electrode NE according to alternative embodiments. Where the display panel 110 does not include the notch electrode NE, the direction of the movement of the first fluid FL1 may be controlled by the shape of the pixel electrode PE.

The reflective electrode RE may be further disposed on the pixel electrode PE and the notch electrode NE. The reflective electrode RE reflects light incident into the electro-wetting display 100 when the electro-wetting display 100 is used as a reflective-type display apparatus. Thus, the reflective electrode RE may include a metal material having a high light reflectance, for example, aluminum.

The display panel 110 may further include the storage electrode STE longitudinally extended in the first direction D1 and disposed between the first and second gate lines GLi-1 and GLi. The storage electrode STE faces the pixel electrode PE to form a storage capacitor. The storage electrode STE is connected to a storage line SLi to receive the common voltage. The storage line SLi is longitudinally extended in the first direction D1.

Referring to FIG. 9, the display panel 110 includes the first base substrate 111, and the second base substrate 119 facing the first base substrate 111.

The first and second gate lines GLi-1 and GLi, the gate electrode GE, and the storage electrode STE are disposed on the first base substrate 111. The gate insulating layer 112 is disposed on the first and second gate lines GLi-1 and GLi, the gate electrode GE, and the storage electrode STE. In addition, the semiconductor layer SEL is disposed on the gate insulating layer 112.

The source electrode SE is disposed directly on the semiconductor layer SEL, and the drain electrode DE is disposed directly on both the semiconductor layer SEL and the gate insulating layer 112. The source electrode SE and the drain electrode DE are spaced apart from each other on the semiconductor layer SEL. The source electrode SE and the drain electrode DE are covered by the protective layer 113, and the organic insulating layer 114 may be further disposed on the protective layer 113.

The pixel electrode PE and the notch electrode NE are disposed on the organic insulating layer 114 and are spaced apart from each other. The pixel electrode PE is connected to the drain electrode DE through the first contact hole CH1 which extends through the organic insulating layer 114 and the protective layer 113, and the pixel electrode PE is connected to the gate protrusion electrode GEE through the second contact hole CH2 which extends through the gate insulating layer 112, the protective layer 113, and the organic insulating layer 114.

The reflective electrode RE may be further disposed on the pixel electrode PE and the notch electrode NE to reflect the incident light. The hydrophobic insulating layer 115 is disposed on the reflective electrode RE. The barrier wall 116 may be disposed on the hydrophobic insulating layer 115 to space the pixels PX apart from each other.

The color filter CF may be disposed on the second base substrate 119. The color filter CF may be removed from the display panel 110 according to alternative embodiments. The common electrode CE is disposed on the color filter CF. The common electrode CE faces the pixel electrode PE and is applied with the common voltage.

The first and second fluids FL1 and FL2 are disposed between the first and second base substrates 111 and 119. The first fluid FL1 may be oil having the hydrophobic property. In addition, the first fluid FL1 may include a black color dye or a material that absorbs light such that the first fluid FL1 absorbs the incident light. The second fluid FL2 may be a material having electrical conductivity or polarity, such as water. The first and second fluids FL1 and FL2 are immiscible with each other since the first and second fluids FL1 and FL2 have different specific gravities from each other. Thus, the first and second fluids FL1 and FL2 are separated from each other with reference to a boundary therebetween.

The barrier wall 116 may reduce or effectively prevent the first fluid FL1 from moving toward an adjacent pixel.

FIGS. 8 and 9 show the structure of the electro-wetting display 100 when the electro-wetting display 100 is used as the reflective-type display apparatus. Accordingly, in the case that the electro-wetting display 100 is used the transmissive-type display apparatus, the electro-wetting display 100 does not need to include the reflective electrode RE, and the area of the storage electrode STE of the electro-wetting display 100 may be varied to transmit the incident light.

FIG. 10 is a timing diagram illustrating an exemplary embodiment of a method of driving the display panel of FIGS. 8 and 9, and FIGS. 11A to 11C are cross-sectional views showing the display panel to illustrate the movement of the first and second fluids according to the timing diagram shown in FIG. 10.

Referring to FIG. 10, the electro-wetting display 100 sequentially drives the first to n-th gate lines GL1 to GLn within one frame time period 1FR to display an image. The one frame time period 1FR may be 1/60 second or 1/120 second.

In FIG. 10, among the first to n-th gate lines GL1 to GLn, a gate line located at the (i−1)th row is referred to as a (i−1)th gate line GLi-1 and a gate line located at the i-th row is referred to as an i-th gate line GLi. In the illustrated exemplary embodiment, "i" is a constant number equal to or larger than 2. In addition, a pixel electrode disposed in the pixel connected to the i-th gate line GLi is referred to as an i-th pixel electrode PEi. The timing diagram shown in FIG. 10 shows the levels of the voltages applied to the first to n-th gate lines GL1 to GLn and the i-th pixel electrode PEi.

Referring to FIGS. 10 and 11A, the voltage is not applied to the i-th pixel electrode PEi when a gate-on signal is not applied to the (i–1)th gate line GLi-1. Accordingly, the first fluid FL1 completely covers the hydrophobic insulating layer 115 as shown in FIG. 11A.

Figure 11B:
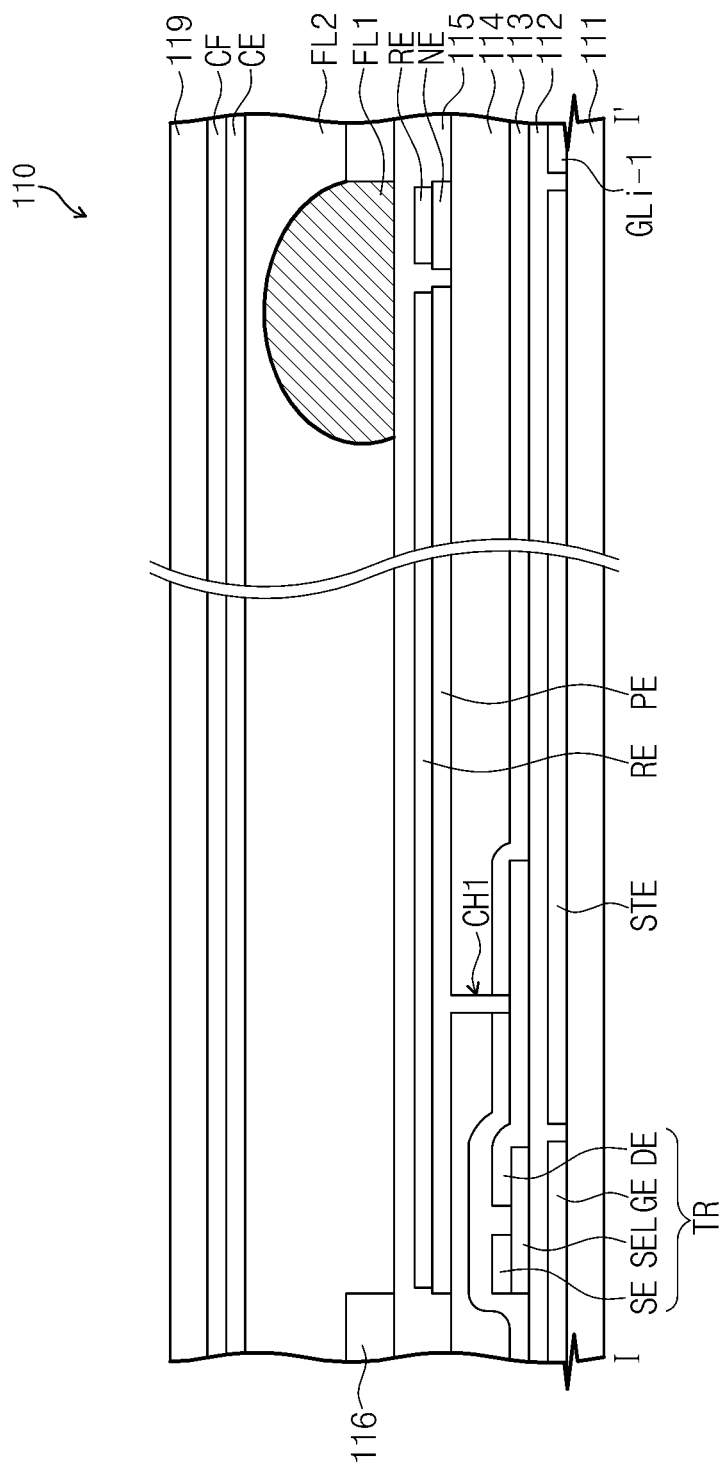

Referring to FIGS. 10 and 11B, when the gate-on signal is applied to the (i–1)th gate line GLi-1 during a first time period t1, the gate-on signal is applied to the i-th pixel electrode PEi during the first time period t1. Thus, the first fluid FL1 disposed on the i-th pixel electrode PEi is spaced apart from the barrier wall 116 and moves toward the notch electrode NE. In detail, when the gate-on voltage is applied to the i-th pixel electrode PEi, the second fluid FL2 disposed above the i-th pixel electrode PEi moves toward the hydrophobic insulating layer 115 by an electric field formed between the i-th pixel electrode PEi and the common electrode CE, and makes contact with the hydrophobic insulating layer 115. As a result, the first fluid FL1 disposed on the i-th pixel electrode PEi gathers around the notch electrode NE by the movement of the second fluid FL2.

As shown in FIGS. 10 and 11C, the data voltage is applied to the i-th pixel electrode PEi in response to the gate-on signal applied to the i-th gate line GLi during a second time period t2, and the data voltage is maintained during one frame time period.

In other words, the i-th pixel electrode PEi makes the first fluid FL1 move toward the notch electrode NE by receiving the gate-on signal provided through the (i–1)th gate line GLi-1 before the data voltage is applied to the i-th pixel electrode PEi. Thus, abnormal gray scale appearing on the pixel due to the hysteresis phenomenon may be reduced or prevented when the specific gray scale is displayed by applying the data voltage to the i-th pixel electrode PEi.

FIGS. 12A to 12D are plan views illustrating an exemplary embodiment of a method of manufacturing the display panel of FIG. 8.

Figure 12A:
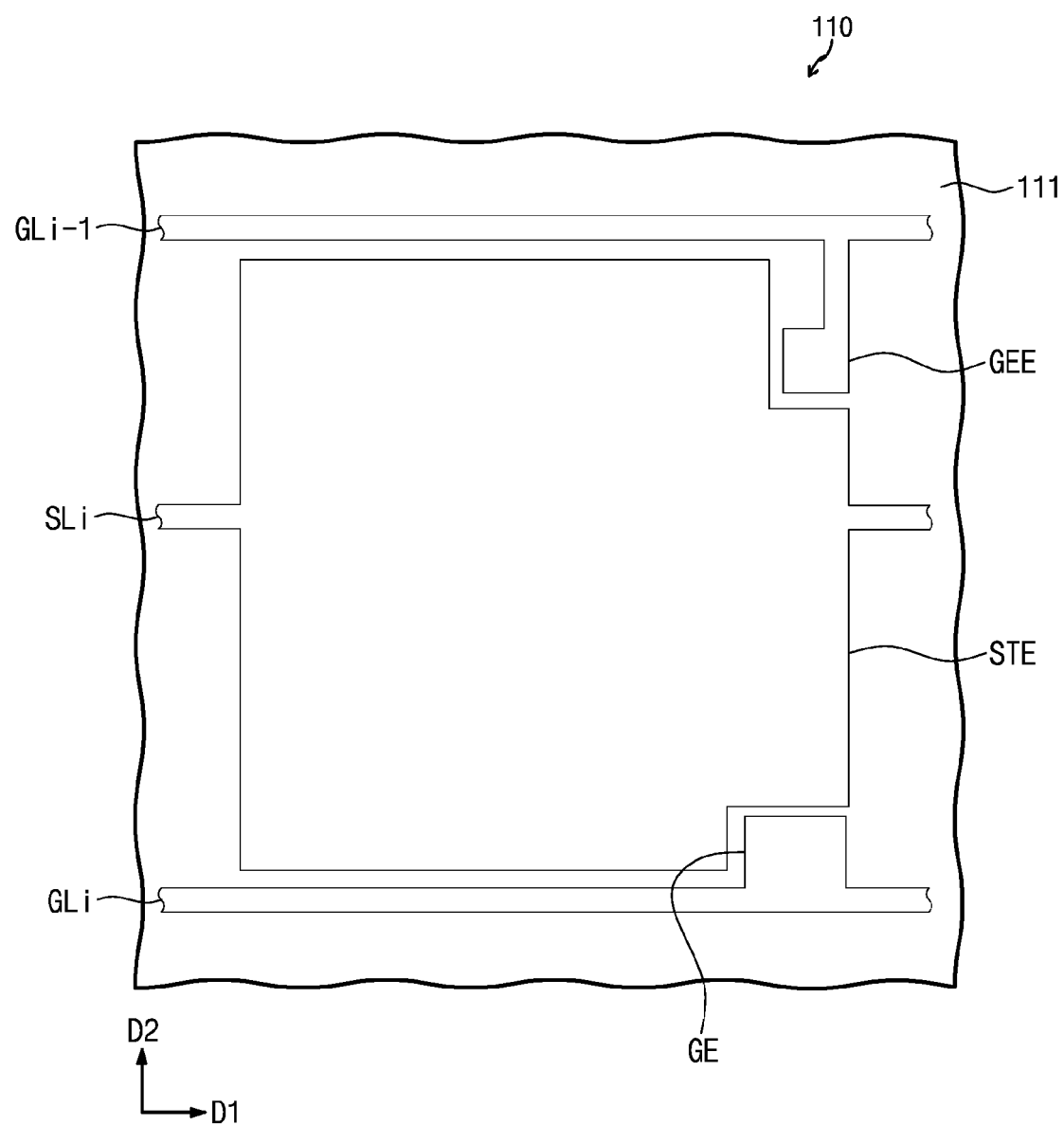
FIGS. 12A to 12D are plan views illustrating an exemplary embodiment of a method of manufacturing the display panel of FIG. 8.

Referring to FIG. 12A, the first gate line GLi-1, the second gate line GLi, and the storage line SLi are formed on the first base substrate 111 to be longitudinally extended in the first direction D1 and spaced apart from each other. In addition, the gate protrusion electrode GEE extended from the first gate line GLi-1, the gate electrode GE extended from the second gate line GLi, and the storage electrode STE extended from the storage line SLi are formed on the first base substrate 111.

Although not shown in FIG. 12A, the gate insulating layer 112 is formed on the first base substrate 111 to cover the first gate line GLi-1, the second gate line GLi, and the storage line SLi. In addition, the semiconductor layer SEL is formed on the gate electrode GE and the gate insulating layer 112.

Figure 12B:
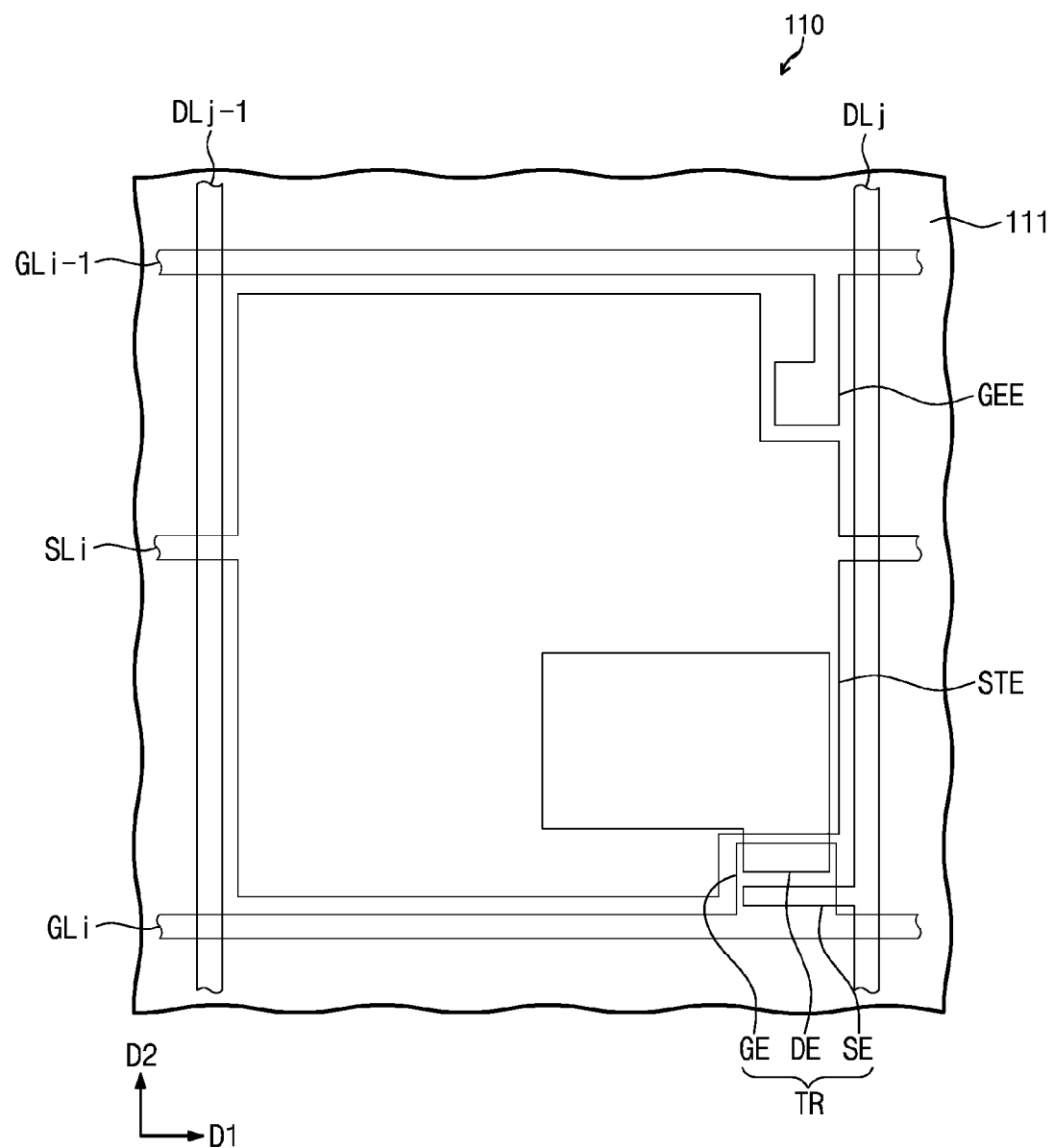

Referring to FIG. 12B, the first data line DLj-1 and the second data line DLj are formed on the gate insulating layer 112 to be spaced apart from each other and are longitudinally extended in the second direction D2. The source electrode SE is extended from the second data line DLj, and the drain electrode DE is formed spaced apart from the source electrode SE on the gate insulating layer 112.

Although not shown in FIG. 12B, the protective layer 113 is formed on the first data line DLj-1 and the second data line DLj. In addition, the organic insulating layer 114 may be further formed on the protective layer 113.

Figure 12C:
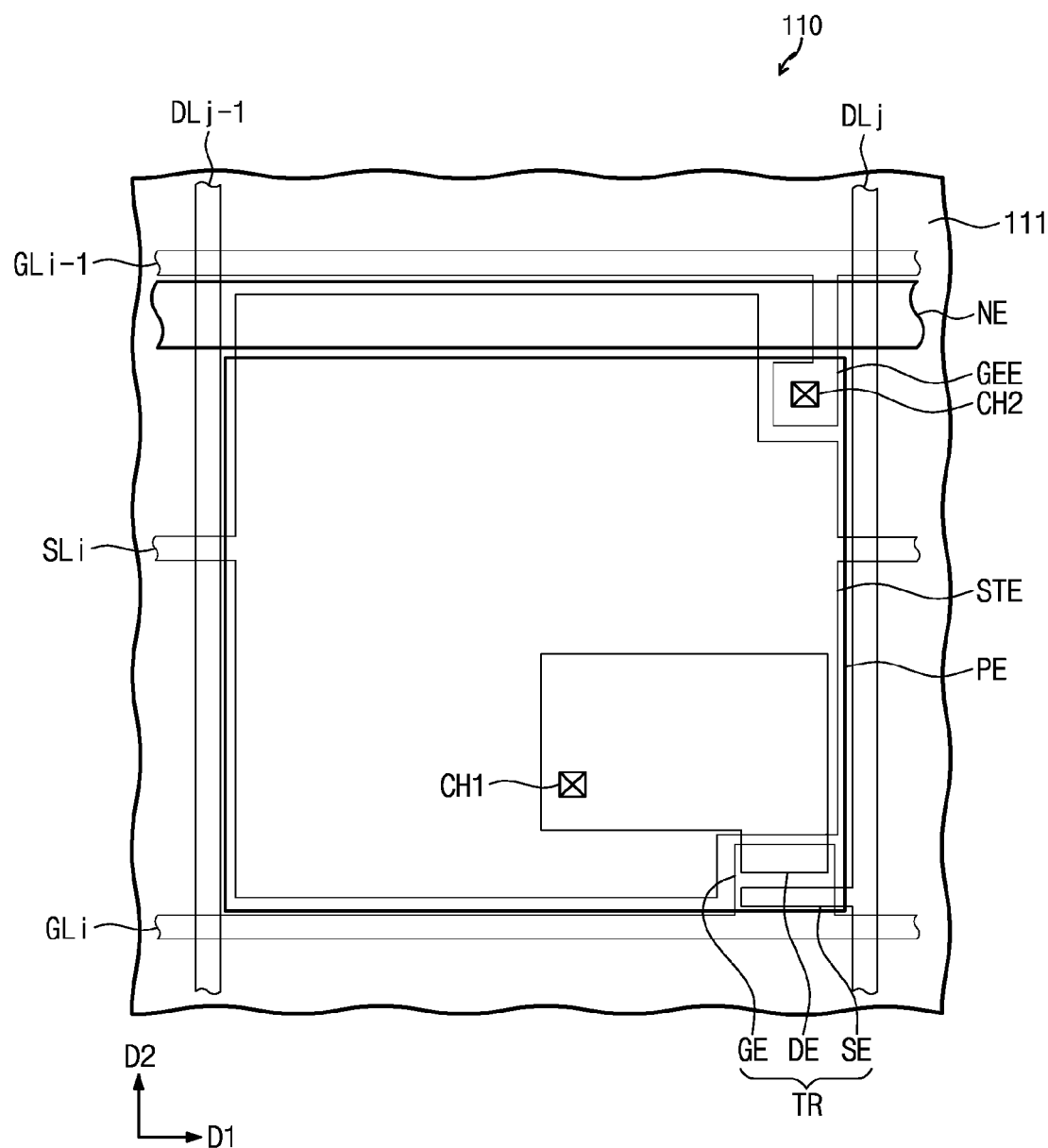

Referring to FIG. 12C, the pixel electrode PE and the notch electrode NE are formed on the protective layer 113 and the organic insulating layer 114. The notch electrode NE is longitudinally extended in the first direction D1 parallel to the first gate line GLi-1.

The pixel electrode PE is connected to the drain electrode DE through the first contact hole CH1 formed through the thickness of the protective layer 113 and the organic insulating layer 114. In addition, the pixel electrode PE is connected to the gate protrusion electrode GEE through the second contact hole CH2 formed through the thickness of the gate insulating layer 112, the protective layer 113, and the organic insulating layer 114.

Figure 12D:
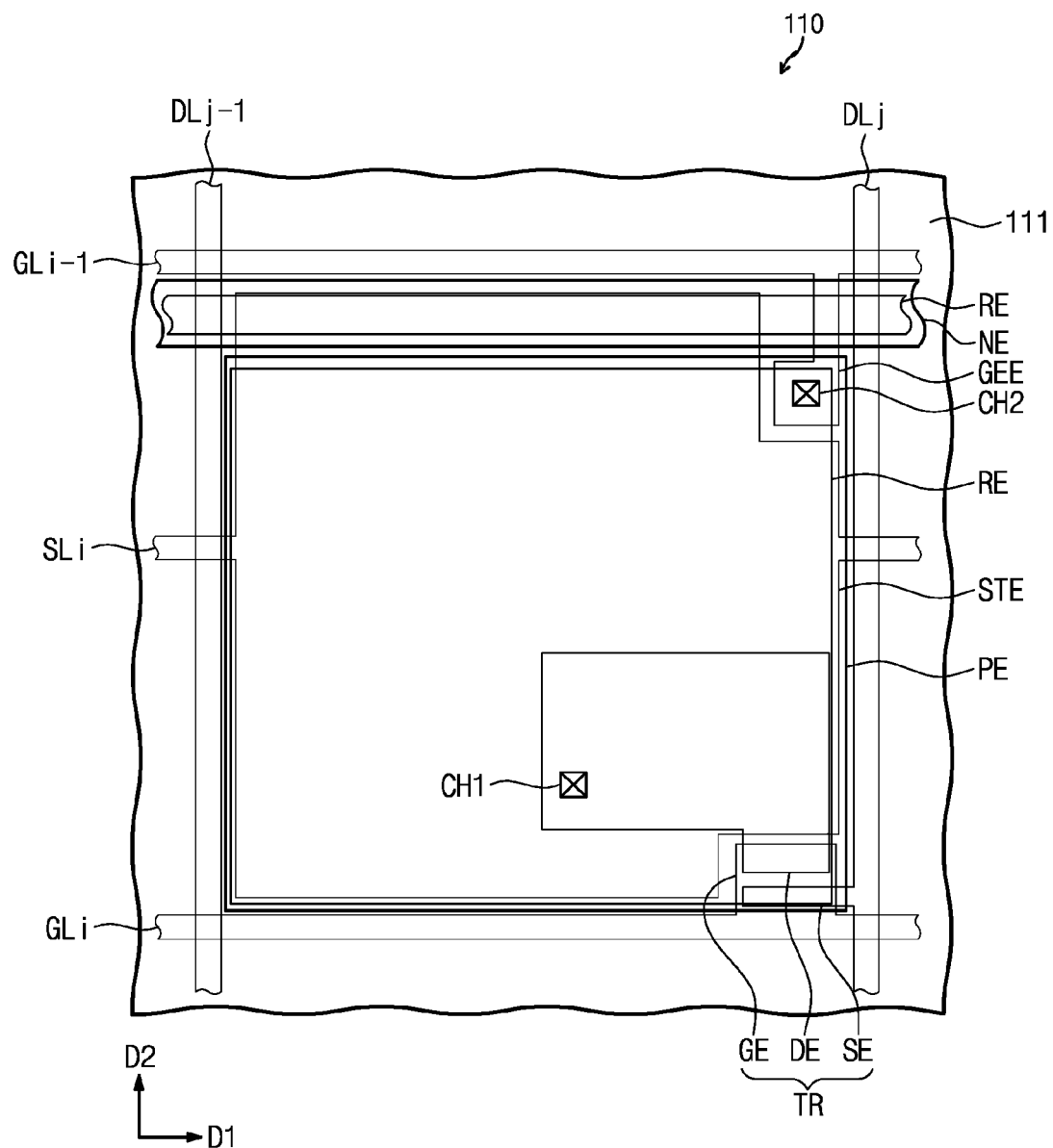

Referring to FIG. 12D, the reflective electrode RE is formed on the pixel electrode PE and the notch electrode NE. The reflective electrode RE includes a material having the high light reflectance to reflect the light incident from an exterior.

Figure 13:
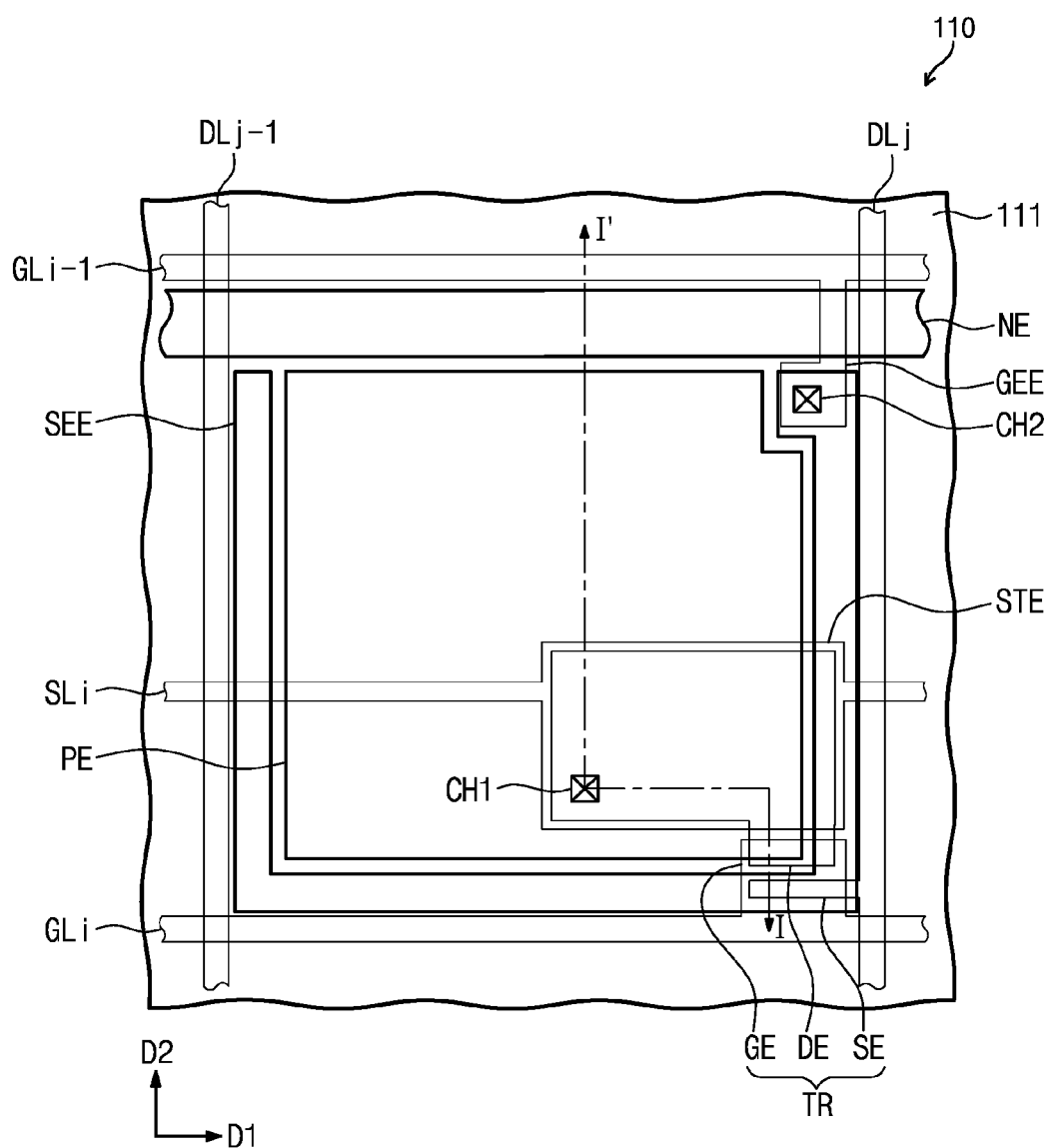
FIG. 13 is an enlarged plan view showing another exemplary embodiment of the display panel of FIG. 1 according to the invention.
Figure 14:
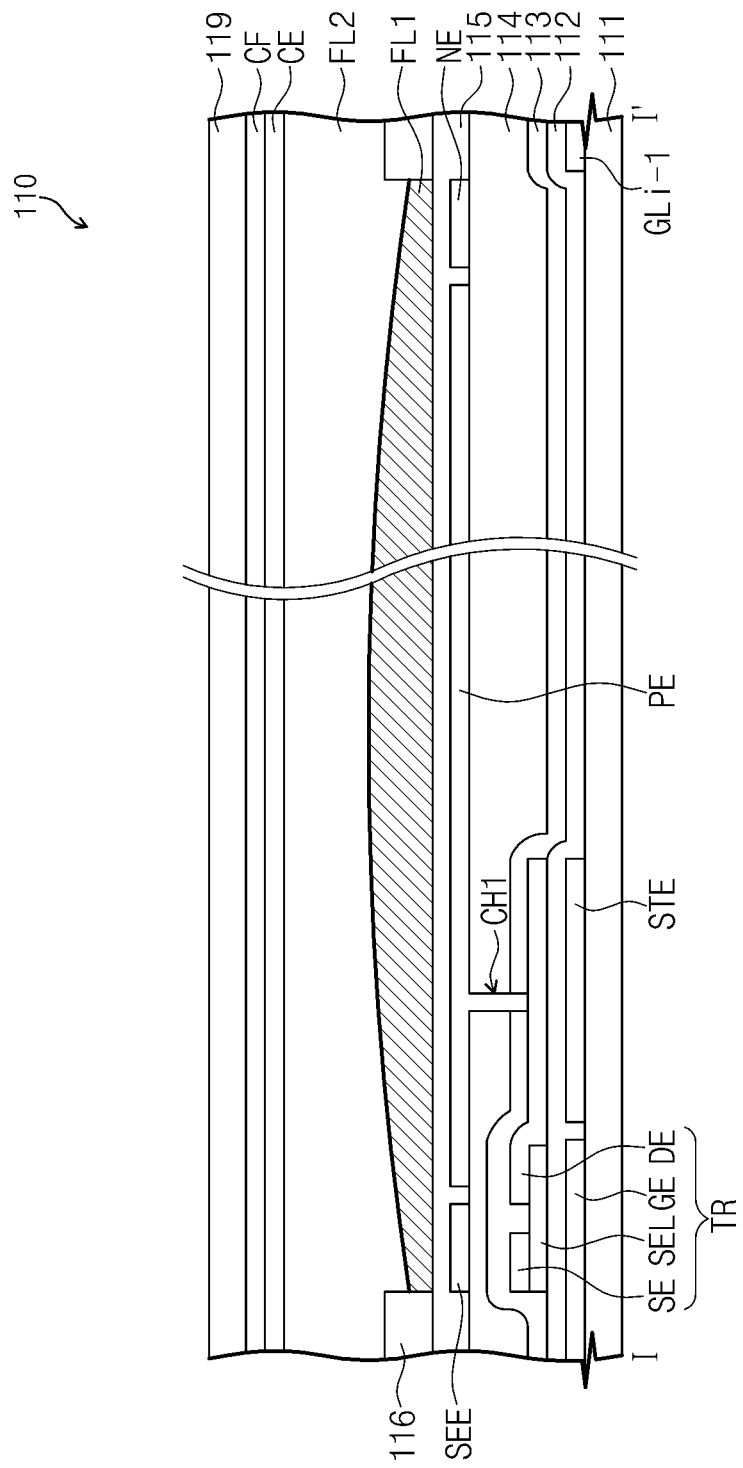
FIG. 14 is a cross-sectional view taken along line I-I' of FIG. 13.

FIG. 13 is an enlarged plan view showing another exemplary embodiment of the display panel of FIG. 1 according to the invention and FIG. 14 is a cross-sectional view taken along line I-I' of FIG. 13. In FIG. 13, the same reference numerals denote the same elements in FIG. 2, and thus detailed descriptions of the same elements will be omitted. In addition, for the convenience of explanation, one pixel has been shown in FIG. 13 since the pixels shown in FIG. 1 have the same structure and function. FIG. 13 shows an electro-wetting display that may be operated in a transmissive mode.

Referring to FIGS. 13 and 14, the electro-wetting display 100 does not include a reflective electrode RE on the pixel electrode PE, the notch electrode NE, and the spacing electrode SEE. In addition, the storage electrode STE is overlapped with the drain electrode DE and has a relatively small area such that the light provided from the backlight unit (not shown) transmits through the display panel 110. Thus, the light incident to the display panel 110 from the backlight unit may transmit through the pixel electrode PE, the notch electrode NE, and the spacing electrode SEE, so the electro-wetting display 100 may be used as a transmissive-type display apparatus.

Figure 15:
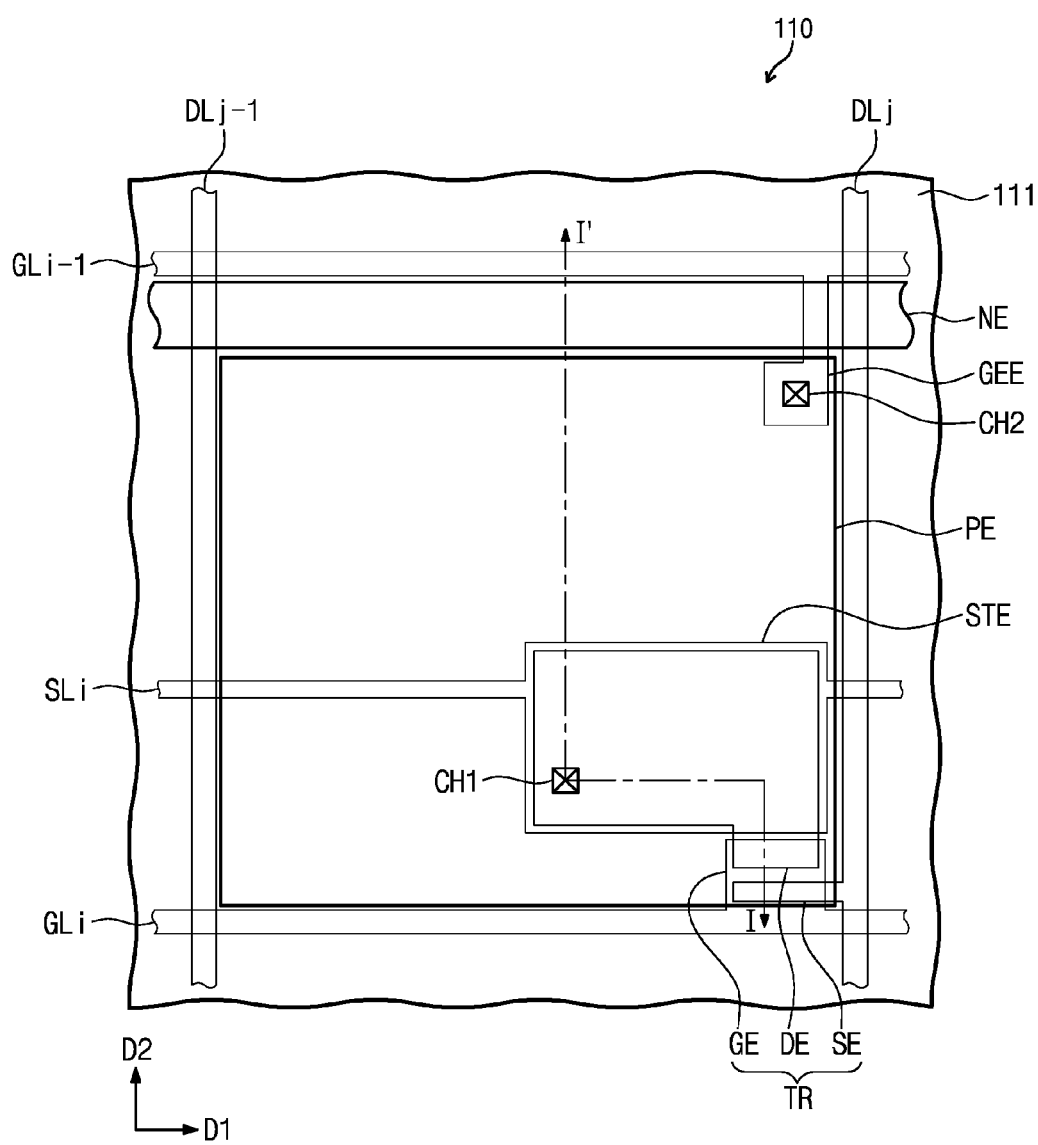
FIG. 15 is an enlarged plan view showing another exemplary embodiment of the display panel of FIG. 1 according to the invention.
Figure 16:
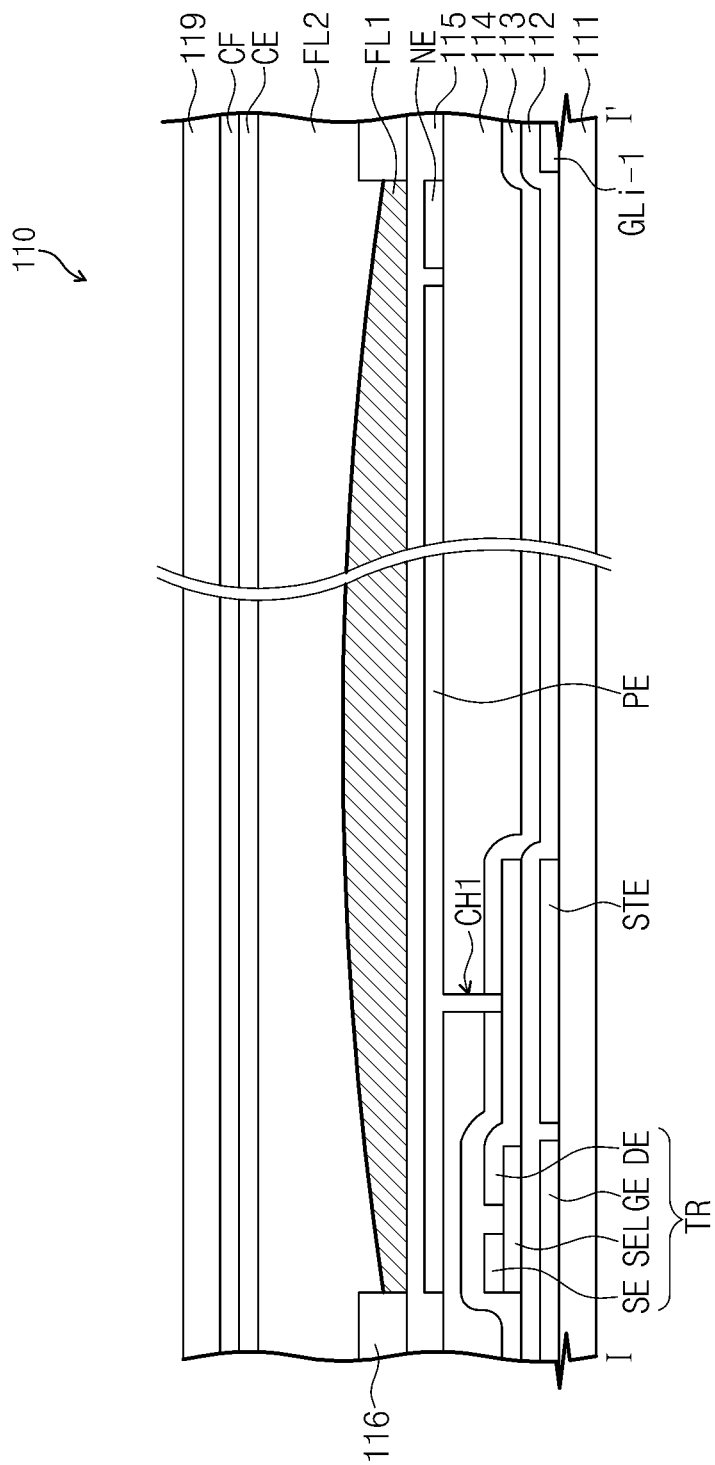
FIG. 16 is a cross-sectional view taken along line I-I of FIG. 15.

FIG. 15 is an enlarged plan view showing another exemplary embodiment of a display panel of FIG. 1 according to the invention and FIG. 16 is a cross-sectional view taken along line I-I of FIG. 15. In FIG. 15, the same reference numerals denote the same elements in FIG. 8, and thus detailed descriptions of the same elements will be omitted. In addition, for the convenience of explanation, one pixel has been shown in FIG. 15 since the pixels shown in FIG. 1 have the same structure and function. FIG. 13 shows an electro-wetting display that may be operated in a transmissive mode.

Referring to FIGS. 15 and 16, the electro-wetting display 100 does not include a reflective electrode RE on the pixel electrode PE and the notch electrode NE. In addition, the storage electrode STE is overlapped with the drain electrode DE and has a relatively small area to allow the light provided from the backlight unit (not shown) to transmit through the display panel 110. Thus, the light incident to the display panel 110 from the backlight unit may transmit through the pixel electrode PE and the notch electrode NE, so the electro-wetting display 100 may be used as a transmissive-type display apparatus.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. An electro-wetting display comprising:
a first substrate comprising a plurality of gate lines, a plurality of data lines which cross the gate lines and are insulated from the gate lines, and a plurality of pixels in connection with the gate lines and the data lines;
a second substrate which faces the first substrate; and
a fluid between the first substrate and the second substrate, and comprising a first fluid and a second fluid which are immiscible with each other,
each of the pixels comprising:
a switching device in connection with an i-th gate line of the gate lines and a j-th data line of the data lines, where the "i" is a constant number equal to or larger than 2 and the "j" is a constant number equal to or larger than 1;
a pixel electrode in connection with the switching device; and
further comprising a spacing electrode adjacent to a first side of the pixel electrode and in connection with a (i−1)th gate line of the gate lines.

2. The electro-wetting display of claim 1, wherein the each of the pixels further comprises a reflective electrode on the pixel electrode, wherein the reflective electrode reflects a light incident to the pixels.

3. The electro-wetting display of claim 1, wherein the each of the pixels further comprises a notch electrode adjacent to a second side different from the first side of the pixel electrode.

4. The electro-wetting display of claim 3, wherein the spacing electrode has a U-shape and surrounds the pixel electrode in cooperation with the notch electrode.

5. The electro-wetting display of claim 4, wherein the notch electrode is adjacent to a side of the pixel electrode, at which the spacing electrode is not positioned.

6. The electro-wetting display of claim 3, wherein the each of the pixels further comprises an insulating layer which overlaps the pixel electrode, the notch electrode, and the spacing electrode.

7. The electro-wetting display of claim 6, wherein the first fluid layer comprises oil, the second fluid layer comprises water, and the insulating layer has a hydrophobic property.

8. The electro-wetting display of claim 3, wherein
the second substrate comprises a common electrode which faces the pixel electrode,
the pixel electrode receives a data voltage through the switching device,
the common electrode and the notch electrode receive a reference voltage, and
the spacing electrode receives a gate voltage applied through the (i−1)th gate line.

9. The electro-wetting display of claim 8, wherein
the first fluid layer overlaps a portion of the pixel electrode, and
the second fluid layer is on the first fluid layer, wherein the second fluid layer moves according to a level difference between the data voltage and the reference voltage and changes a size of an area of the pixel electrode overlapped by the first fluid layer.

10. The electro-wetting display of claim 8, wherein
the each of the pixels further comprises a barrier wall which surrounds the pixel electrode and maintains the first fluid layer within the pixel, and
the spacing electrode receives a gate-on voltage of the gate voltage through the (i−1)th gate line, and the first fluid layer moves away from the barrier wall from the spacing electrode receiving the gate-on voltage.

11. An electro-wetting display comprising:
a first substrate comprising a plurality of gate lines, a plurality of data lines which cross the gate lines and are insulated from the gate lines, and a plurality of pixels in connection with the gate lines and the data lines;
a second substrate which faces the first substrate; and
a fluid layer between the first substrate and the second substrate, and comprising a first fluid layer having a color and a second fluid layer which is transparent,
each of the pixels comprising:
a switching device in connection with an i-th gate line of the gate lines and a j-th data line of the data lines, where the "i" is a constant number equal to or larger than 2 and the "j" is a constant number equal to or larger than 1; and
a pixel electrode in connection with the switching device and a (i−1)th gate line of the gate lines.

12. The electro-wetting display of claim 11, wherein the each of the pixels further comprises a reflective electrode on the pixel electrode, wherein the reflective electrode reflects a light incident to the pixels.

13. The electro-wetting display of claim 11, wherein the each of the pixels further comprises a notch electrode adjacent to a side of the pixel electrode, wherein the notch electrode controls a direction of movement of the first fluid layer.

14. The electro-wetting display of claim 13, wherein the each of the pixels further comprises an insulating layer which overlaps the pixel electrode and the notch electrode.

15. The electro-wetting display of claim 14, wherein the first fluid layer comprises oil, the second fluid layer comprises water, and the insulating layer has a hydrophobic property.

16. The electro-wetting display of claim 13, wherein
the second substrate comprises a common electrode which faces the pixel electrode,
the pixel electrode receives a data voltage through the switching device and a gate voltage applied through the (i−1)th gate line, and
the common electrode receives a reference voltage.

17. The electro-wetting display of claim 16, wherein
the each of the pixels further comprises a storage electrode which faces the common electrode, wherein the pixel electrode is between the storage electrode and the common electrode, and
the storage electrode receives the reference voltage.

18. The electro-wetting display of claim 16, wherein
the first fluid layer overlaps a portion of the pixel electrode, and
the second fluid layer is on the first fluid layer, wherein the second fluid layer moves according to a level difference between the data voltage and the reference voltage and changes a size of an area of which the first fluid layer overlaps the pixel electrode.

19. The electro-wetting display of claim 16, wherein the each of the pixels further comprises a barrier wall which surrounds the pixel electrode and maintains the first fluid layer within the pixel.

20. The electro-wetting display of claim 19, wherein the pixel electrode receives a gate-on voltage of the gate voltage through the (i−1)th gate line, and the first fluid layer moves away from the barrier wall from the pixel electrode receiving the gate-on voltage.

* * * * *